(12) United States Patent
Bistline

(10) Patent No.: US 7,549,307 B2
(45) Date of Patent: Jun. 23, 2009

(54) METHOD AND APPARATUS FOR SECURING AN OBJECT TO A VEHICLE

(76) Inventor: Donald A. Bistline, P.O. Box 2316, Vista, CA (US) 92085

( * ) Notice: Subject to any disclaimer, the term of this patent is extended or adjusted under 35 U.S.C. 154(b) by 527 days.

(21) Appl. No.: 10/685,662

(22) Filed: Oct. 14, 2003

(65) Prior Publication Data

US 2005/0076684 A1   Apr. 14, 2005

(51) Int. Cl.
*E05B 73/00* (2006.01)
(52) U.S. Cl. .................. 70/18; 70/19; 70/58; 211/4; 224/315; 248/553
(58) Field of Classification Search .................. 70/58, 70/14, 18, 19, 62; 211/4, 8; 224/315, 322–324; 248/551–553, 503, 505; 410/77, 97
See application file for complete search history.

(56) References Cited

U.S. PATENT DOCUMENTS

| | | | | |
|---|---|---|---|---|
| 3,848,785 A | * | 11/1974 | Bott ........................ | 224/319 |
| 4,261,496 A | * | 4/1981 | Mareydt et al. ............. | 224/315 |
| 4,340,376 A | * | 7/1982 | Williams ..................... | 441/74 |
| 5,076,079 A | * | 12/1991 | Monoson et al. ............... | 70/58 |
| 5,582,044 A | | 12/1996 | Bolich | |
| RE35,677 E | * | 12/1997 | O'Neill ...................... | 248/551 |
| 5,692,722 A | * | 12/1997 | Lundagårds ................ | 248/553 |
| 5,706,680 A | * | 1/1998 | Wroble .......................... | 70/18 |
| 5,901,588 A | * | 5/1999 | Frost .............................. | 70/39 |
| 6,263,709 B1 | * | 7/2001 | Kemery et al. .................. | 70/14 |

FOREIGN PATENT DOCUMENTS

| | | |
|---|---|---|
| WO | WO01/60660 | 8/2001 |
| WO | WO 01/60660  * | 8/2001 |

* cited by examiner

*Primary Examiner*—Lloyd A Gall

(57) ABSTRACT

A method and apparatus for securing an object to a vehicle comprises a mounting bracket for being fixedly secured to a vehicle. A mating unit is removably secured to the mounting unit, the mating unit comprising an adjustable shackle and a locking mechanism, the adjustable shackle operative to secure an object, such as a surfboard, snowboard, wakeboard, or skis, to the mating unit and mounting bracket.

8 Claims, 24 Drawing Sheets

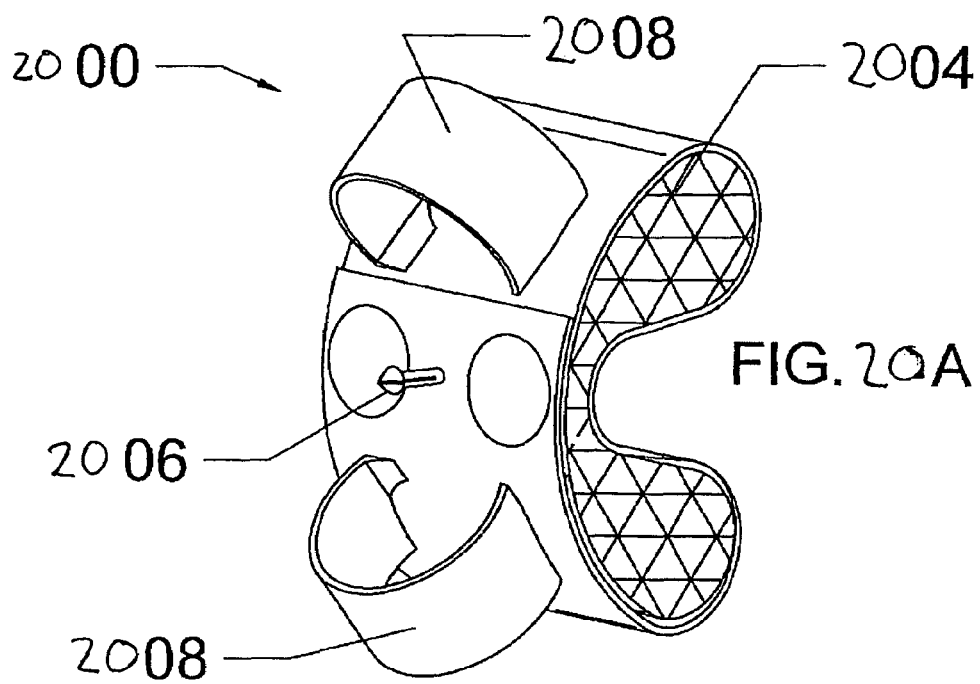
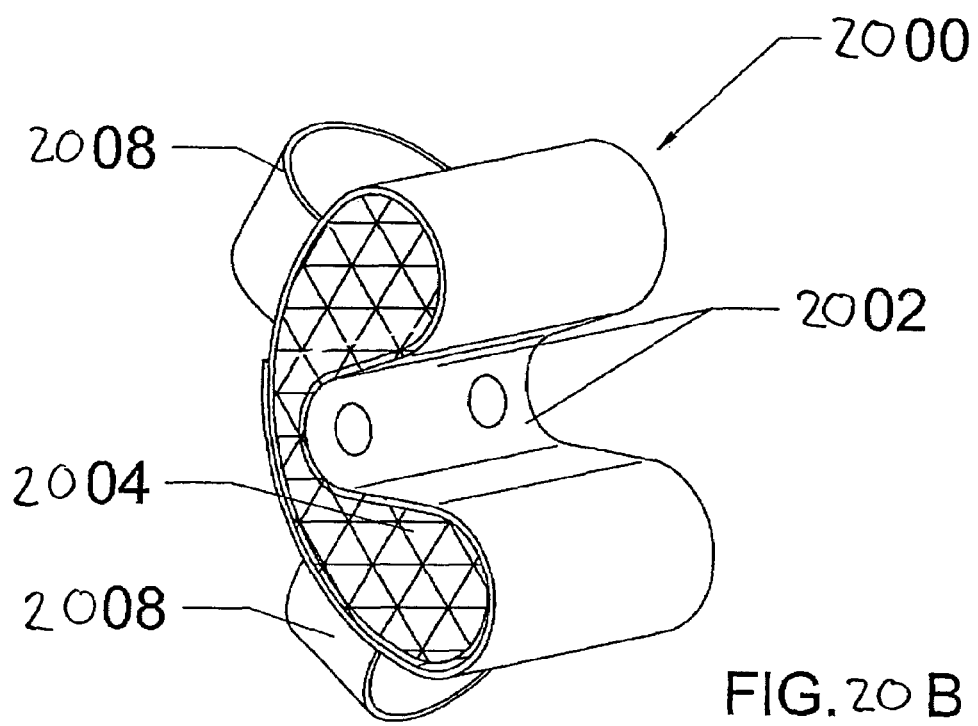

METHOD AND APPARATUS FOR SECURING AN OBJECT TO A VEHICLE

CROSS-REFERENCE TO RELATED APPLICATIONS

This application claims the benefit under 35 U.S.C. 120 and is related to United States patent application number 10/613,896, filed Jul. 3, 2003, now abandoned.

BACKGROUND

I. Field of Use

The present invention relates to the field of theft prevention devices. More specifically, the present invention relates to a method and apparatus for securing an object, such as a surfboard, to a structure such as a motor vehicle.

II. Description of the Related Art

The sport of surfing has gained in popularity in the United States and abroad over the past several years. It is estimated that there are currently 3.5 million people who enjoy surfing in the United States alone. In most cases, surfboards are transported to the ocean on top of a car via roof racks or in the bed of a pickup truck. The typical method of securing surfboards to car top roof racks is by a canvas or rubber straps.

One of the disadvantages of transporting surfboards via motor vehicle is that few vehicles are large enough to transport surfboards inside. Consequently, most people transport surfboards external to their vehicles. There exists removable or permanent roof-top racks for automobiles whereby one or more surfboards can be secured for transport. Individuals owning pickup trucks can simply place their surfboard(s) in the bed of the pickup truck.

One disadvantage of transporting large objects such as surfboards external to a vehicle is that they are highly visible and therefore attract thieves when an owner leaves the surfboard unattended. These large objects are difficult to secure against theft due to their large size and unibody construction. Most roof racks today do not have a way to lock the surfboard securely to the vehicle. In most cases, elastic straps are all that is used to secure the surfboard to the vehicle. These are quickly and easily removed by thieves.

Most available surfboard locking mechanisms use a steel cable that is attached to a "leash plug" in the surfboard. The other end of the cable is then secured to a structure on the vehicle using a padlock or the like. These systems are generally easy for thieves to defeat, because the steel cable can be cut quickly with bolt cutters, or the leash plug can be destroyed.

A locking mechanism that does not rely on steel cables is described in a patent issued to Bolich (U.S. Pat. No. 5,582,044). In this patent, a surfboard is secured to the top of two roof racks using four independent locking mechanisms located at four edges of the surfboard. However, this device requires four elaborate locking mechanisms, which may be expensive to build and to purchase. Another drawback of this mechanism is that the surfboard may be easily removed if only one of the four locking mechanisms is defeated. Yet another drawback is that it is time consuming to lock and unlock the surfboard using four separate locking mechanisms.

Another locking mechanism that does not rely on steel cables is described a PCT publication entitled "Surfboard Security Locking System" to Spry (WO01/60660). In this publication, a locking device is described that secures a surfboard to a car roof rack using an adjustable, U-shaped locking mechanism. Half of the locking mechanism is fixedly secured to a vehicle roof rack, while the other half is removable. A major drawback of this invention is that half of the U-shaped locking mechanism remains secured to the vehicle, even when a surfboard is not being transported. This results in added wind resistance to the vehicle, and also degrades the look and styling of the vehicle.

What is needed is a surfboard locking mechanism that is easy to remove and install, while providing a high degree of security.

SUMMARY

A method and apparatus for securing an object to a vehicle. In one embodiment, an apparatus for securing an object to a vehicle comprises a mounting bracket and a mating unit removably connected to the mounting bracket. The mating unit comprises an adjustable shackle, a mating portion, the mating portion being fixedly secured to the adjustable shackle, and a first locking mechanism, the first locking mechanism operative to allow adjustment of the shackle in an unlocked position and to prevent adjustment of the shackle in a locked position. Finally, the apparatus comprises a second locking mechanism for removably securing the mating portion to the mounting bracket.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein:

FIGS. 20a and 20b illustrate two views of an optional cushion used in the security apparatus of FIG. 1 or FIG. 6;

DETAILED DESCRIPTION

The methods and apparatus for securing an object to a vehicle detailed herein enable one to quickly and easily secure a surfboard to a vehicle to prevent theft. However, it should be understood that other types of articles could be secured in the alternative, such as snow skis, water skis, wakeboards, snowboards, etc. The described embodiments additionally allow the security apparatus to be quickly installed and removed, leaving only an unobtrusive mounting bracket remaining attached to the vehicle.

Figure 1:
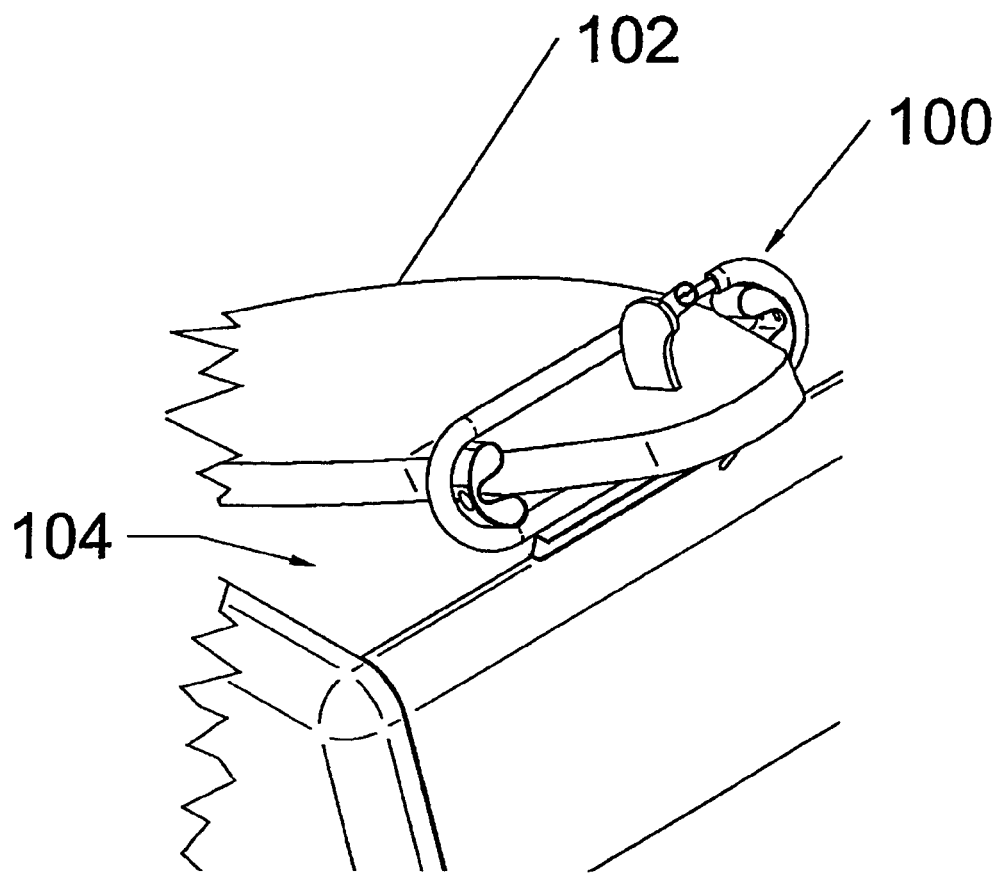
FIG. 1 illustrates one embodiment of a security apparatus for securing an object to a vehicle.

FIG. 1 illustrates one embodiment of a security apparatus 100 for securing an object to a vehicle. Shown is a surfboard 102 laying upside-down in the bed 104 of a typical pick-up truck. The rear portion of the surfboard extends past the tailgate of the pick-up truck with its tip lying on the floor of bed 104. The security apparatus 100 comprises a mounting bracket and mating unit, discussed later herein. The mating unit comprises an adjustable, locking shackle which is designed to fit snugly around the width of the surfboard 102 while in a locked position. The physical properties of the surfboard 102 (i.e., board contour, fin(s)) prevent it from being removed from the adjustable shackle. Other objects are retained within the adjustable shackle by their physical properties, such as board shape, bindings, etc. The mating unit is designed to be easily removed from the mounting bracket when security apparatus 100 is not in use, so that it does not interfere with other uses of the pick-up truck during normal use.

Figure 2A:
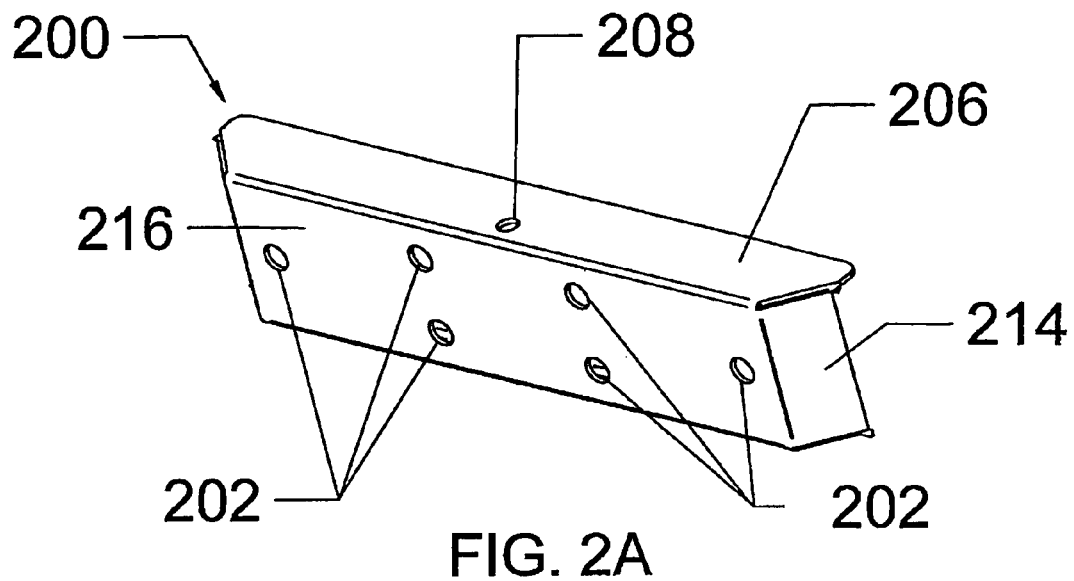
FIGS. 2a and 2b illustrate one embodiment of a mounting bracket of the security apparatus in FIG. 1.
Figure 2B:
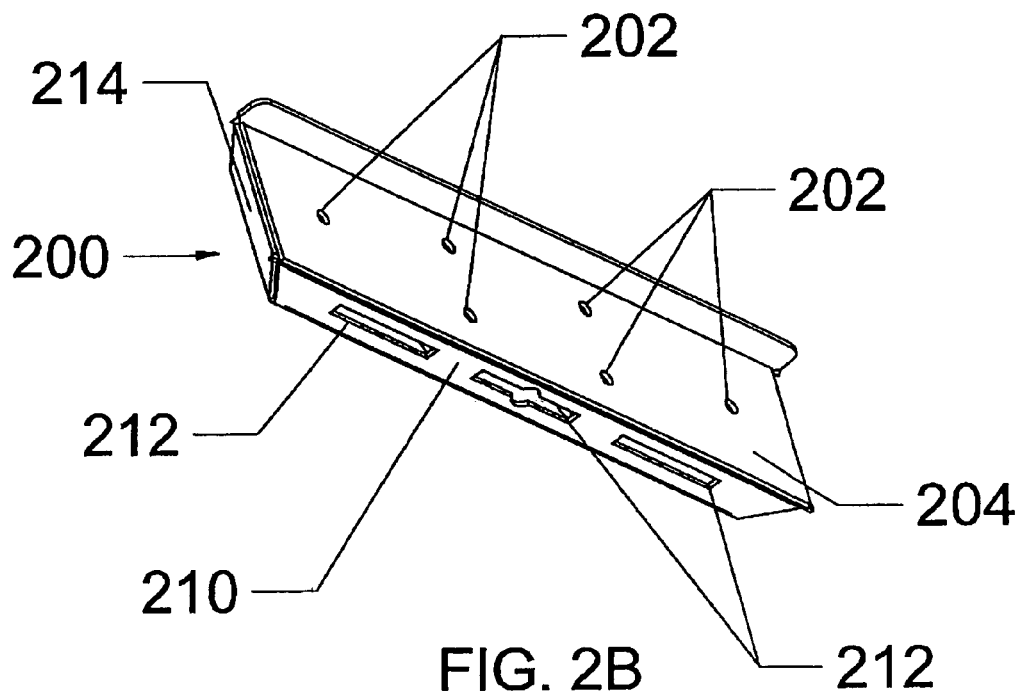

FIGS. 2a and 2b illustrate one embodiment of a mounting bracket 200, shown in two isometric views. The mounting bracket 200 is designed to be fixedly installed onto a vehicle, such as against an inside portion of a tailgate of a pickup truck. Of course, mounting bracket 200 could alternatively be located in other locations on a vehicle, such as the roof of any vehicle, or on any location in a bed 104 of a pickup truck, such as the bottom surface, outer portion of a tailgate, or on an inside or outside portion of bed 104. As used herein, the term "fixedly" generally means that mounting bracket 200 is not easily be removed.

Mounting bracket 200 is typically manufactured out of any durable, rigid material, such as any type of metal, wood, plastic, or other suitable material. It may comprise a hollow "box", having a top surface 206, a bottom surface 210, side surfaces 214, and a rear planar surface 204. It may also include a front surface 216 for forming a hollow enclosure. A great number of alternative embodiments are possible, including mounting bracket 200 comprising only top surface 206, bottom surface 210, and rear planar surface 204. In another alterative embodiment, mounting bracket 200 comprises a solid block of material. In yet another alternative embodiment, mounting bracket 200 comprises only rear planar surface 204 and top surface 206. Mounting bracket 200 is also not restricted to a rectangular shape. As such, mounting bracket 200 may comprise a square, rectangle, triangle, circle, or other shape when viewed in a planar manner.

In the example of FIG. 1, mounting bracket 200 is fixedly attached to an inside portion of a pickup truck tailgate using one or more fastening devices, such as screws, bolts, rivets, or other known fastening devices, through mounting holes 202 located on a rear planar surface 204 and/or on front surface 216. Of course, mounting bracket 200 could be fixedly attached to a surface by using mounting brackets, or even by welding. The only limitation regarding the way in which mounting bracket 200 is fixedly attached to a surface is that it is not easily removable after installation.

In one embodiment, mounting bracket 200 comprises a top surface 206, having an aperture 208 located thereon, and a bottom surface 210, having, in this embodiment, three slots 212. Aperture 208 is designed to receive a rigid element, such as a deadbolt, pin, bolt, shackle, or other element which removably secures a mating unit, described later herein, to mounting bracket 200. It should be understood that aperture 208 could alternatively be located on other surfaces of mounting bracket 200, such as on one or both side surfaces 214.

The slots 212 are each designed to receive a tab from the mating unit. The combination of these two features allow the mating unit to be removably secured to mounting bracket 200. The term "revovably", as used herein, generally means that the mating unit is able to be quickly and easily installed and removed from mounting bracket 200.

Figure 3A:
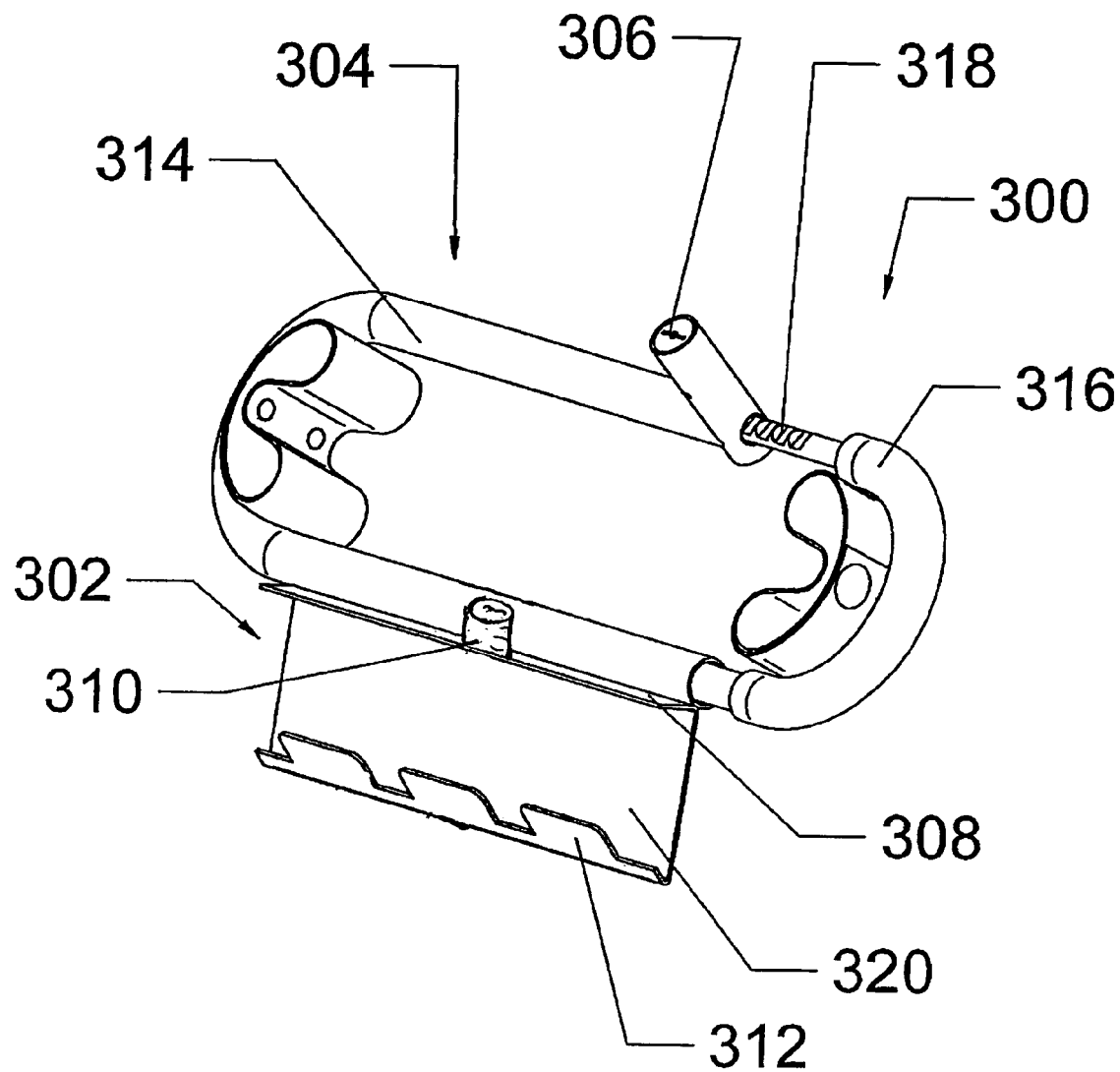
FIG. 3a illustrates one embodiment of a mating unit, suitable for use with the security apparatus of FIG. 1.

FIG. 3a illustrates one embodiment of a mating unit 300 of the security apparatus of FIG. 1. In this embodiment, mating unit 300 comprises a mating portion 302, an adjustable shackle 304, and a first locking mechanism 306. Mating unit 300 is also preferably constructed of a rigid material such as metal, wood, plastic, rubber, or a combination of materials, strong enough to prevent a thief from destroying mating unit 300 during an attempted theft. A fixed portion 314 of adjustable shackle 304 is fixedly connected to a top surface 308 of mating portion 302, typically by welding or other suitable method known in the art. An adjustable portion 316 of adjustable shackle 304 inserts into fixed portion 314, thereby forming an adjustable opening through which surfboard 102, or other object, may be placed.

Both adjustable portion 316 and fixed portion 314 are preferably formed of a material not easily cut through with a hacksaw, for instance. The outer surface of each portion may additionally be covered with a hard plastic, rubber, or other material to add difficulty to anyone attempting to cut through either portion. Alternatively, or in addition to the hard material, padding may be deposited on fixed portion 314 and a portion of adjustable portion 316 so that minimal damage that might otherwise occur to an object that is secured by adjustable shackle 304.

First locking mechanism 306 comprises a combination or key-operated lock, similar to many adjustable locking devices in common use today. Examples of manufacturers offering such a locking mechanism include ABA locks of Hsin Chuang City, China, and Royal Lock Corporation of Wauconda, Ill. First locking mechanism 306 typically comprises a spring-loaded deadbolt which engages a series of notches 318 located on adjustable portion 316. In an unlocked position, the deadbolt is pushed into a shank portion of first locking mechanism 306 as each of notches 318 pass the deadbolt, thereby allowing free movement of adjustable portion 316 within fixed portion 314 and, thus, allowing an opening formed by adjustable shackle 304 to vary. In a locked position, the deadbolt is prevented from being pushed out of notches 318, thereby preventing the opening formed by adjustable shackle 304 from varying.

Mating portion 302 comprises a top surface 308, having a second locking mechanism 310 located thereon, a lower portion 312, and a plate 320 connecting top surface 308 and lower portion 312. Second locking mechanism 310 aligns with aperture 208 during assembly of mounting bracket 200 and mating unit 300, whereby a retractable deadbolt within second locking mechanism 310 is pushed into aperture 208, thereby removably securing mating unit 300 to mounting bracket 200. The combination of second locking mechanism 310 with lower portion 312 and slots 212, prevents mating unit 300 from being removed from mounting bracket 200 and, hence, the vehicle. As just mentioned, in one embodiment, lower portion 312 comprises three "tabs" for insertion through slots 212 of mounting bracket 200. In other embodiments, there may be fewer or a greater number of tabs, the tabs could comprise pins, or any other extrusion, to fit within a corresponding slot, or other opening, on lower surface 210.

One feature of the embodiments presented herein is that second locking mechanism 310 is generally not accessible once an object has been secured through adjustable shackle 304, because the object covers the second locking mechanism. Therefore, the only way for a thief to remove the object is to defeat the first locking mechanism 306. Another feature of this design is that mating unit 300 may be left secured to mounting unit 200 without fear of mating unit 300 being stolen. It may be desirable, for example, to leave mating unit 300 secured to mounting unit 200 while a user is surfing.

It should be understood that other embodiments of mating unit 300 are possible without deviating from the inventive nature of the previously discussed embodiments. For example, second locking mechanism 310 might comprise securing means such as a rotating latch, or some other physical constraint, rather than a retractable deadbolt. In another embodiment, adjustable shackle 304 could be constructed at an angle roughly perpendicular to plate 320, thereby allowing mounting unit 200/mating unit 300 to be to be mounted to a flat surface, such as the bed of a pickup truck. In this embodiment, an object to be secured would lie on top of mounting unit 200, such as a surfboard lying within the confines of the pickup truck bed. As previously discussed, mounting unit 200 is fixedly attached to the flat surface, then mating unit 300 is removably secured to mounting unit 200. When the second locking mechanism 310 is in a locked position, the securing means secures mating unit 300 to mounting unit 200. The object to be secured is then placed within adjustable shackle 304 and secured by closing the adjustable shackle snugly against the object and locking adjustable shackle 304 using first locking mechanism 306. When the object is secured in place, the second locking mechanism 310 is difficult, if not impossible, to access. The object is removed by unlocking first locking mechanism 306, removing the object, and then placing the second locking mechanism 310 in an unlocked position. In the unlocked position, the securing means allows mating unit 300 to be removed from mounting unit 200.

Figure 3B:
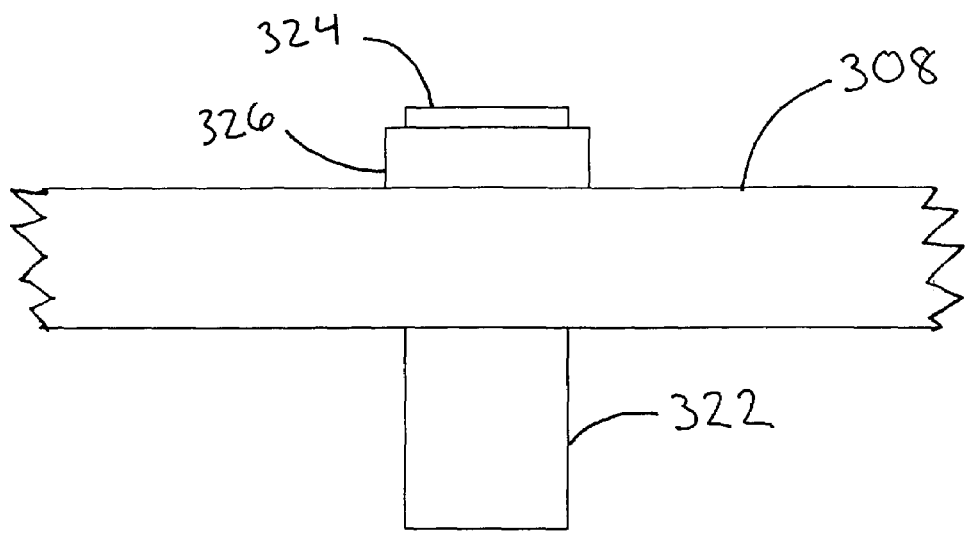
FIG. 3b illustrates a close-up side view of a top surface of the mating unit of FIG. 3a and a locking mechanism, shown in a locked position.

FIG. 3b illustrates a close-up side view of top surface 308 of mating unit 200 and second locking mechanism 310, shown in a locked position. In this position, retractable deadbolt 322 extends through top surface 308 and into aperture 208 during installation. Deadbolt 322 is locked in an extended position by the use of a key or combination operating on keyed portion 324. Keyed portion 324 is located within housing 326.

Figure 3C:
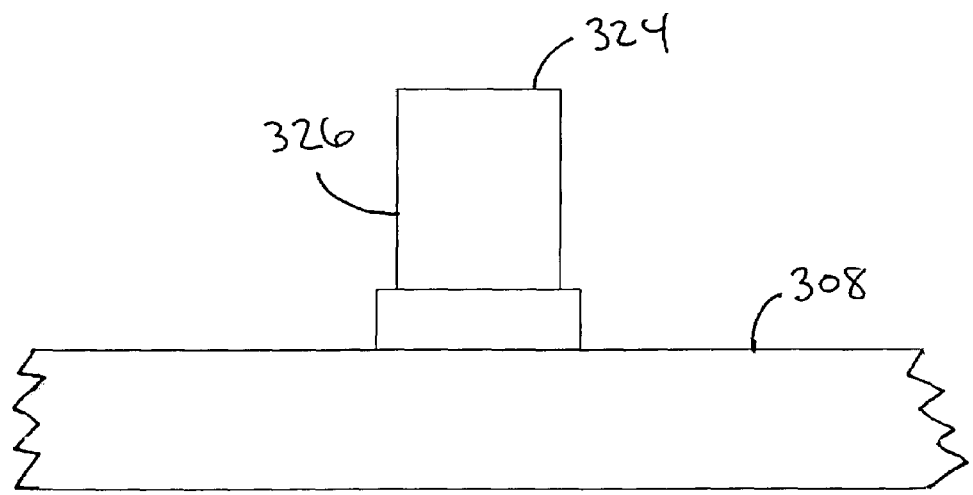
FIG. 3c illustrates a close-up side view of a top surface of the mating unit of FIG. 3a and the locking mechanism in FIG. 3b, shown in an unlocked position.

FIG. 3c illustrates a close-up side view of top surface 308 of mating unit 200 and second locking mechanism 310, shown in an unlocked position. In this position, retractable deadbolt 322 is retracted into housing 326/keyed portion 324 and removed from aperture 208, thereby allowing mating unit 300 to be removed from mounting unit 200. Again, a key or combination operating on keyed portion 324 allows deadbolt 322 to move to the retracted position.

Figure 4:
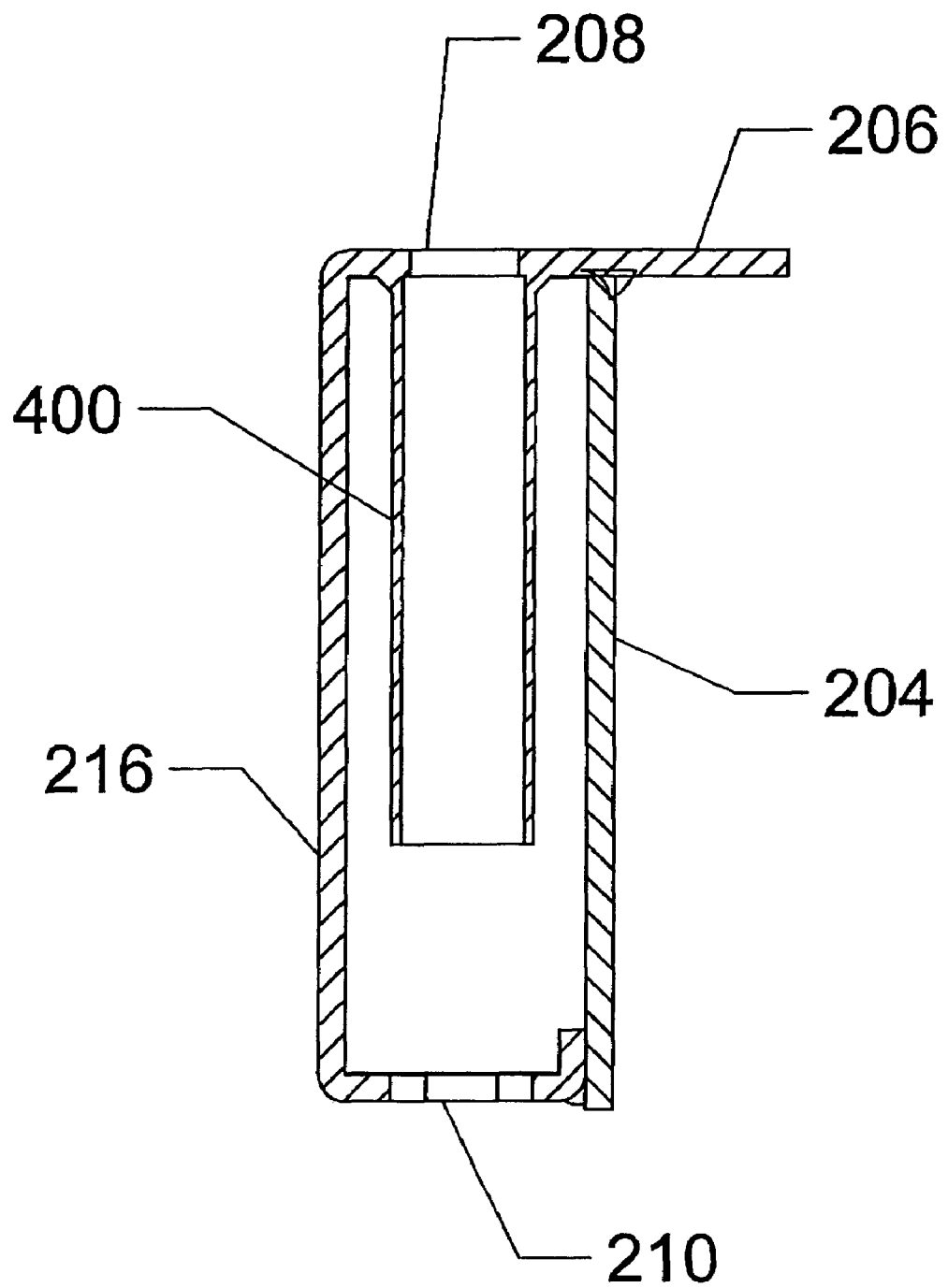
FIG. 4 illustrates an optional cylinder for use with the mounting bracket of FIG. 2 shown in a close-up, cross-sectional view.

FIG. 4 illustrates an optional cylinder 400 for use with the mounting bracket of FIG. 2, shown in a close-up, cross-sectional view. The cylinder 400 prevents deadbolt 322 from being moved laterally from an alignment with aperture 208. This prevents a potential thief from attempting to remove or damage deadbolt 322 in spite of surfboard 102 covering the second locking mechanism 310. The cylinder 400 is typically welded to an undersurface of top surface 206 having a diameter sufficiently large enough to allow deadbolt 322 to be inserted therein.

Figure 5:
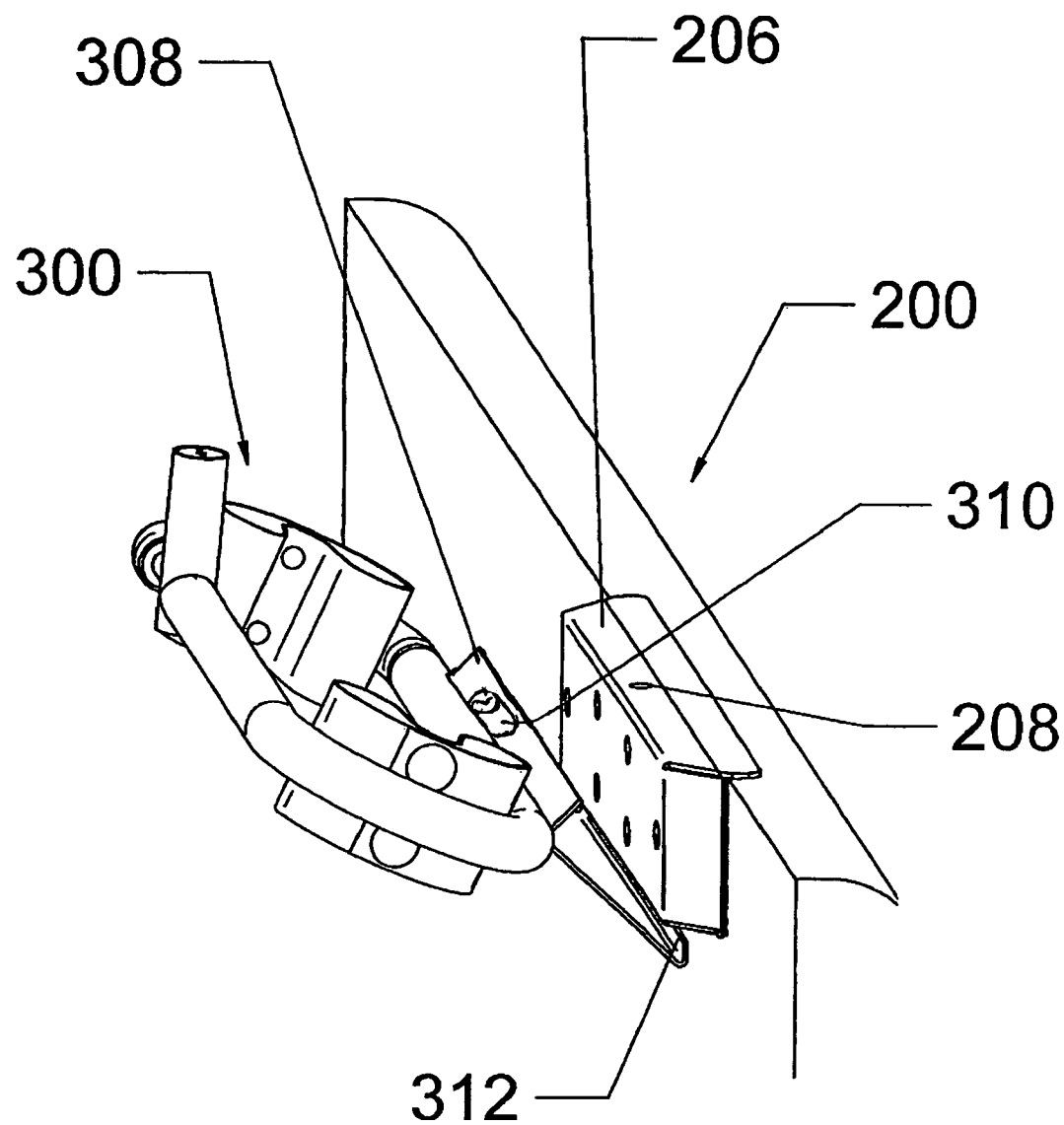
FIG. 5 illustrates the mating unit of FIG. 3a being removably installed onto the mounting bracket of FIG. 2, installed on an inside surface of a pickup truck tailgate.

FIG. 5 illustrates the mating unit 300 of FIG. 3a being removably installed onto the mounting bracket 200 of FIG. 2, installed on an inside surface of a pickup truck tailgate, shown from a side view. Mounting bracket 200 is fixedly secured to the tailgate using the methods described above. Lower portion 312, comprising three tabs in this example, is inserted into slots 212, then mating unit 300 is pivoted so that top surface 308 of mating unit 300 covers top surface 206 of mounting bracket 200. Second locking mechanism 310 is then put into a locked position by pushing down on keyed portion 324 and using a key or combination to lock keyed portion 324 in place, thereby inserted deadbolt 322 through aperture 208 of mounting bracket 200. This design allows for fast installation and uninstallation of the mating unit 300, which is a major advantage over other security mechanisms.

Figure 6:
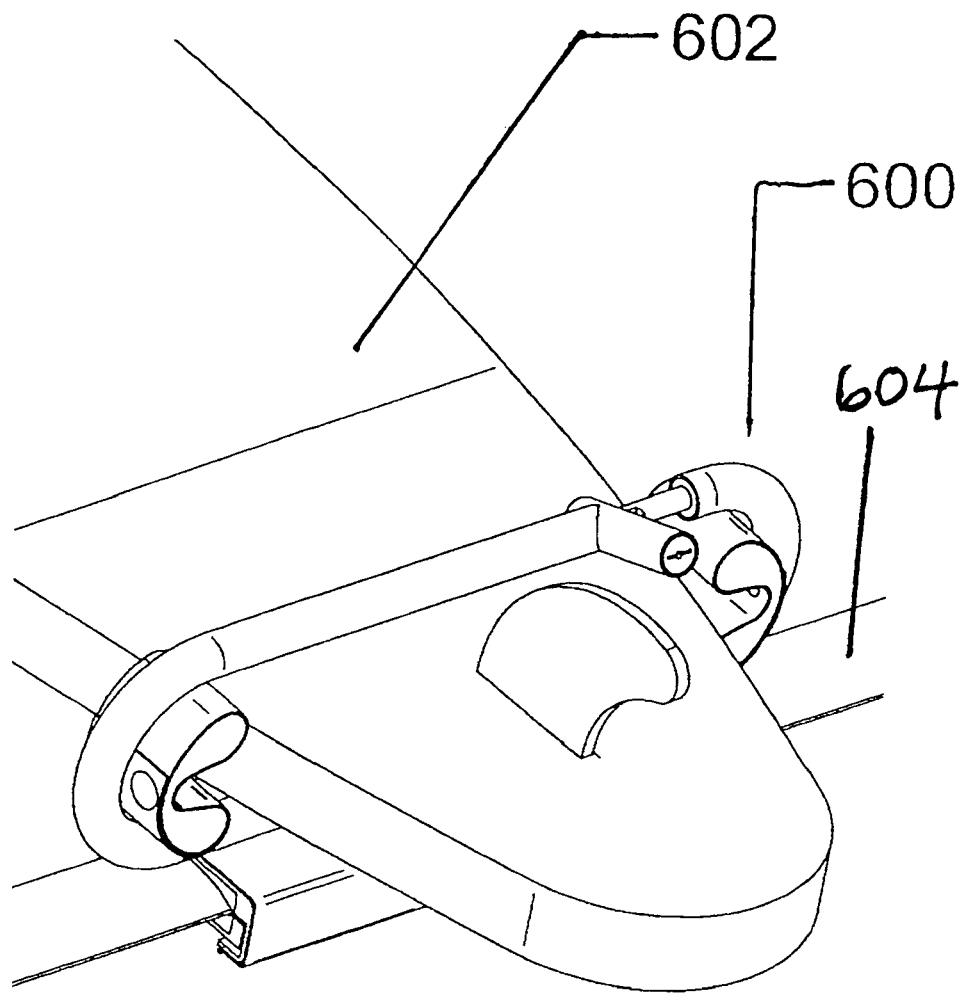
FIG. 6 illustrates another embodiment of a security apparatus for securing an object to a vehicle.

FIG. 6 illustrates another embodiment of a security apparatus 600 for securing an object to a vehicle. Shown is surfboard 602 secured to a vehicle roof rack 604. The security apparatus 600 comprises a set of mounting brackets fixedly secured to roof rack 604 and a mating unit, discussed later herein. Similar to security apparatus 100 of FIG. 1, the mating unit comprises an adjustable, locking shackle, and is designed to be easily removed from the mounting brackets when security apparatus 600 is not in use. Objects such as surfboards, skis, wakeboards, and snowboards are retained within the adjustable shackle by their respective physical properties such as board contour, fin(s), bindings, etc.

Figure 7:
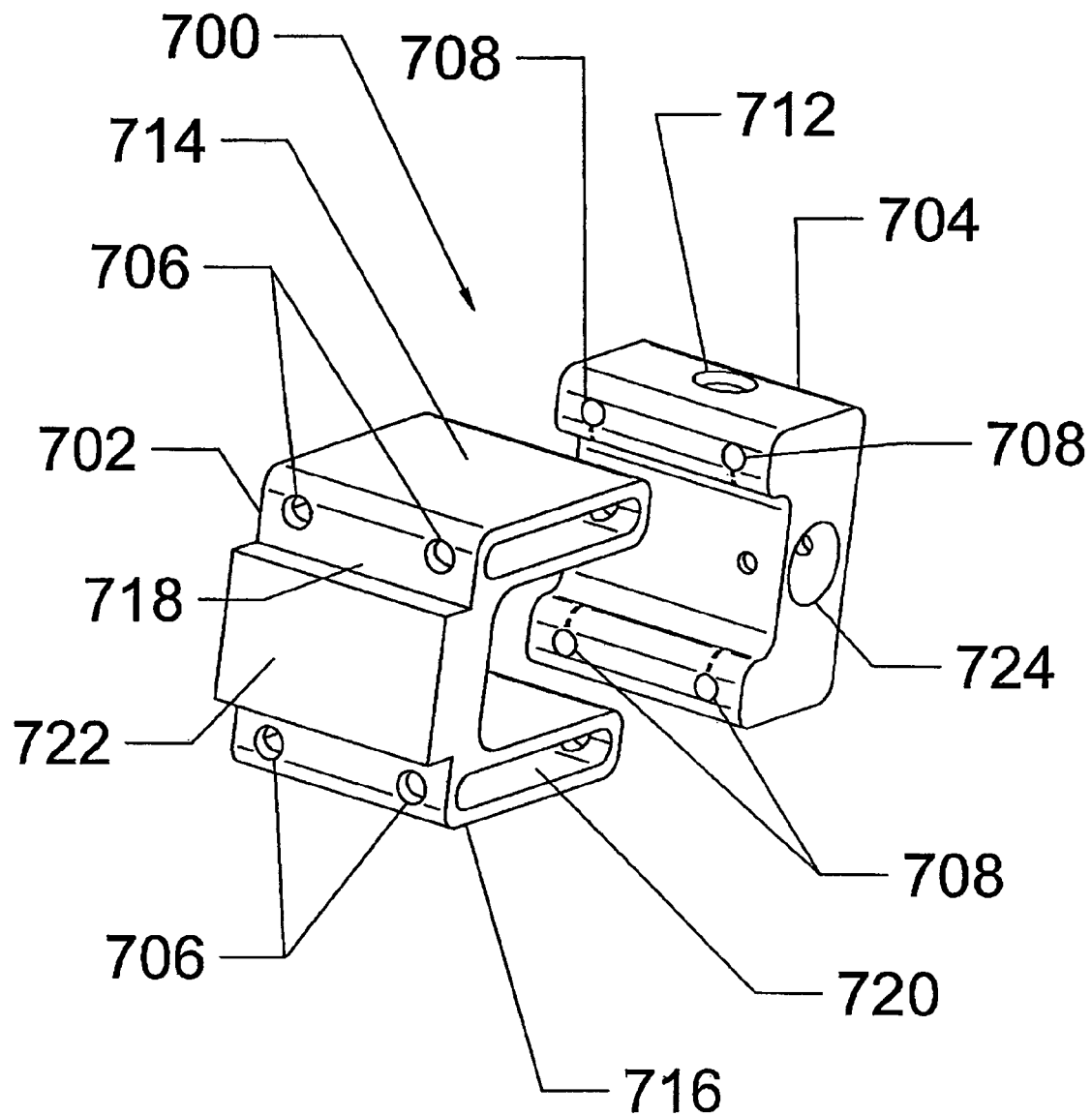
FIG. 7 illustrates a mounting bracket suitable for use with the security apparatus of FIG. 6.

FIG. 7 illustrates a mounting bracket suitable for use with the security apparatus of FIG. 6, shown as mounting bracket 700. Mounting bracket 700 is designed to be fixedly installed onto a vehicle roof rack, and comprises U-shaped bracket 702 and receiving block 704. U-shaped bracket 702 and receiving block 704 are fixedly secured to a vehicle roof rack by placing these elements around such a rack, through an opening formed by the joinder of bracket 702 and block 704. They are secured around the roof rack using fastening means (not shown) such as screws, rivets, bolts, or any other suitable means known in the art, through holes 706 and receptacles 708. Of course, these elements may be secured by other means, such as by welding.

U-shaped bracket 702 comprises a top portion 714, a bottom portion 716, both joined by a rear portion 718. In this embodiment, top portion 714 and bottom portion 716 each comprise a channel 720 running the entire width of each portion, and rear portion 718 comprises a riser 722. These features are optional in the design of mounting bracket 700. The riser 722 is used as a surface against which a mating unit (described below) rests upon assembly.

U-shaped bracket 702 additionally comprises four through holes 706. These holes allow mating hardware, such as screws, rivets, bolts, etc. to be inserted therethrough to engage receptacles 708, such as threaded holes or inserts, in receiving block 704.

Receiving block 704 comprises aperture 712, which is a hole that extends at least a portion through the height of receiving block 704. Aperture 712 is designed to align with a securing means, such as a retractable deadbolt, located on a mating unit as the mating unit is installed onto each mounting bracket 700.

Typically, two mounting brackets 700 are used on a single roof rack for securing an object, while a second roof rack may comprise ordinary means for securing the object during transport. The two mounting brackets 700 are generally spaced apart from one another, approximately twelve inches in one embodiment. In one embodiment, receiving block 704 comprises an alignment hole 724 located on one side of receiving block 704. The alignment hole 724 is designed to receive an alignment rod (not shown) for insertion therein and to a similar hole located on a side of another mounting bracket 700. The alignment rod allows the two mounting brackets 700 to maintain a fixed relationship with each other, which may be important, depending on the shape and curvature of the roof rack to which they are secured.

It should be understood that mounting bracket 700 could comprise numerous alternative features and should not be limited to only the embodiment shown in FIG. 7. In one alternative embodiment, the bracket 702 and block 704 are formed of two sections that surround a roof rack from the bottom and the top, rather than surrounding the roof rack from the sides, as shown in FIG. 7. In other examples, fewer or a greater number of through holes 706 could be used, the through holes 706 could be threaded, aperture 712 could be located through top portion 714, bottom portion 716, and rear portion 718 either alternatively, or in addition to the aperture 712 located on receiving block 704, the alignment hole 724 could be of any cross-sectional shape, including a rectangle, triangle, ellipse, etc.

As mentioned previously, mounting bracket 700 is installed around a roof rack, typically mounted to a roof of a vehicle. However, most roof racks in use do not have a cross section conforming to the opening formed by the joinder of bracket 702 and block 704. Typically, a roof rack cross-section comprises a "wing" cross-section, being flat on a bottom surface and rounded on a top surface. In this case, mounting bracket 700 may not fit well over the roof rack, and allow the mounting bracket 700 to pitch to and fro or allow the mounting bracket 700 to slide out of position on the roof rack. To alleviate this problem, a pair of inserts may be positioned inside the opening of mounting bracket 700, having an outer surface that conforms to the surface of the mounting bracket opening, and an inner surface that conforms to the roof rack surface. Details of this type of insert can be found on FIGS. 13a and 13b, along with accompanying text.

Figure 8:
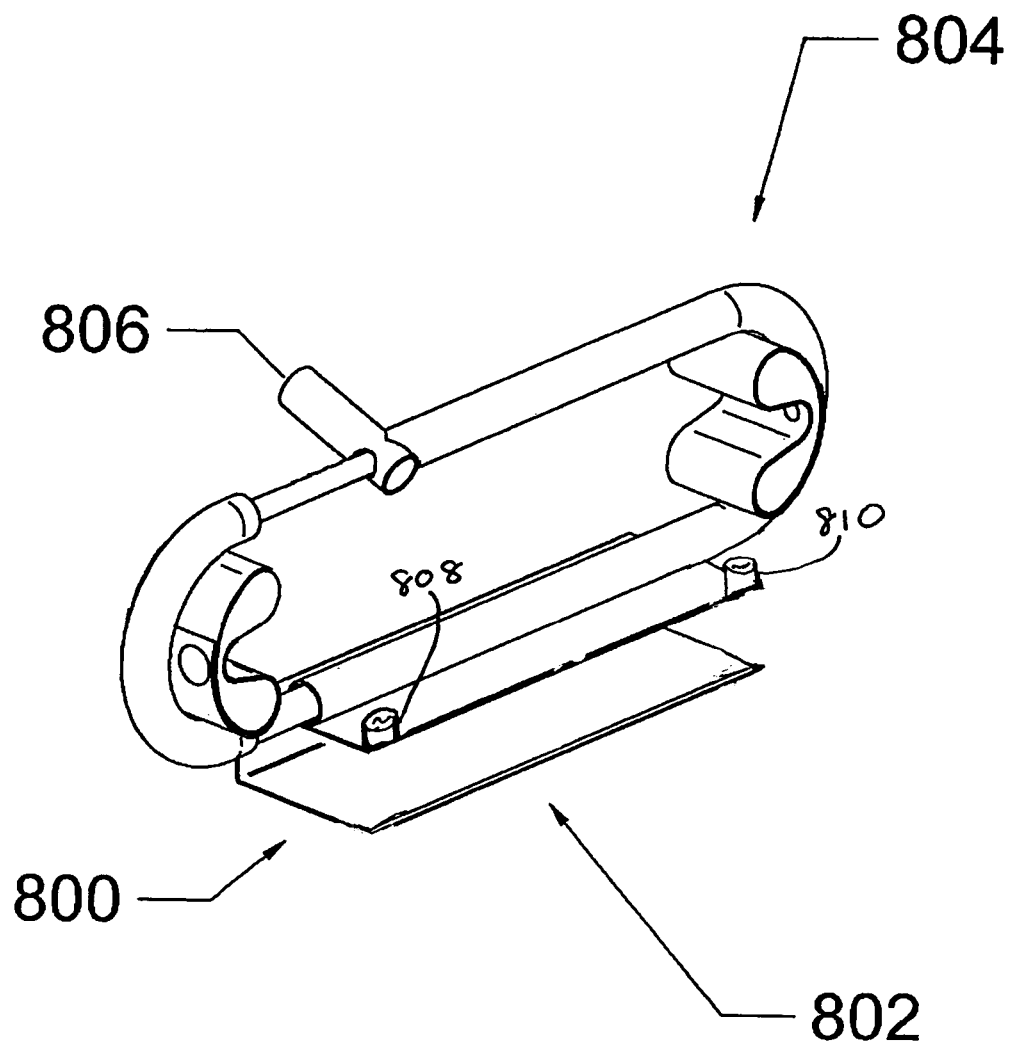
FIG. 8 illustrates a mating unit suitable for use with the security apparatus of FIG. 6.

FIG. 8 illustrates a mating unit 800 suitable for use with the security apparatus of FIG. 6. Mating unit 800 comprises a mating portion 802, an adjustable shackle 804, and a first locking mechanism 806. The structures of mating unit 800 are much the same as mating unit 300, with the exception of mating portion 802. In this embodiment, mating portion 802 comprises an "U" shaped extrusion, having adjustable shackle affixed thereto. The extrusion is designed to slide over a pair of mounting brackets 700 fixedly secured to a vehicle roof rack. The extrusion is removably secured to the mounting brackets by using second and third locking mechanisms 808 and 810, which operate to insert a retractable deadbolt through aperture 712 located on each of two mounting brackets 700. Once an object such as a surfboard is secured in place by adjustable shackle 804, the second and third locking mechanisms 808 and 810 are not easily accessible, because the surface of the object interferes with access to the second and third locking mechanisms.

Figure 9:
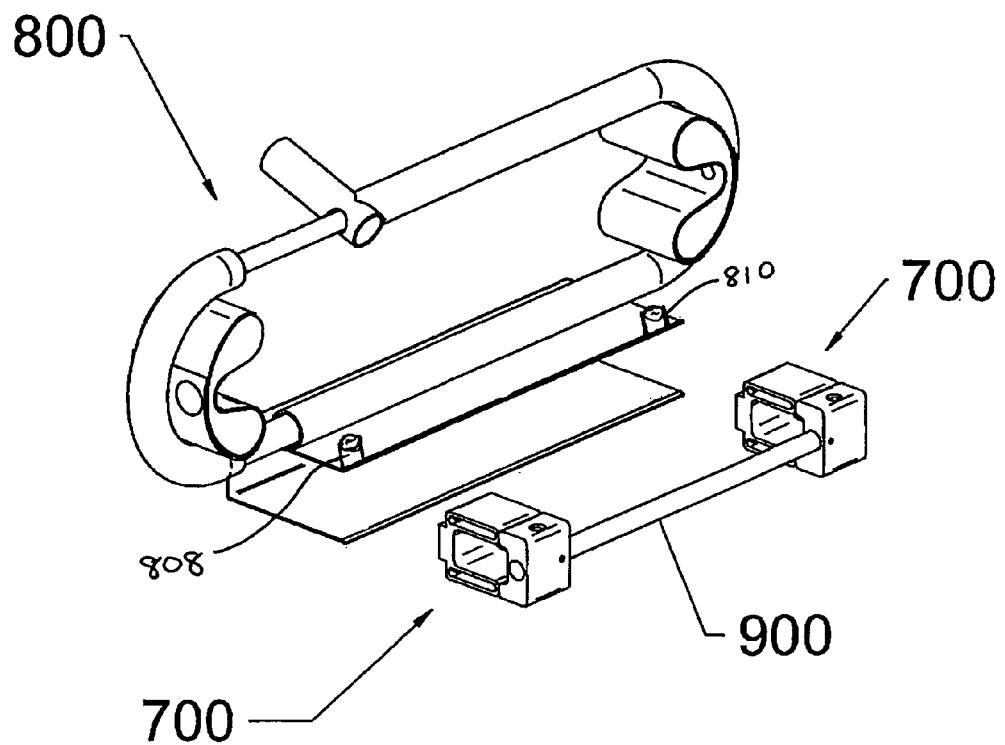
FIG. 9 illustrates the mating unit of FIG. 8 about to be removably installed onto two mounting brackets shown in FIG. 7, installed on a vehicle roof rack.

FIG. 9 illustrates the mating unit 800 of FIG. 8 about to be removably installed onto two mounting brackets 700 of FIG. 7, installed on a vehicle roof rack. Shown is optional alignment rod 900 connecting the two mating units.

Figure 10:
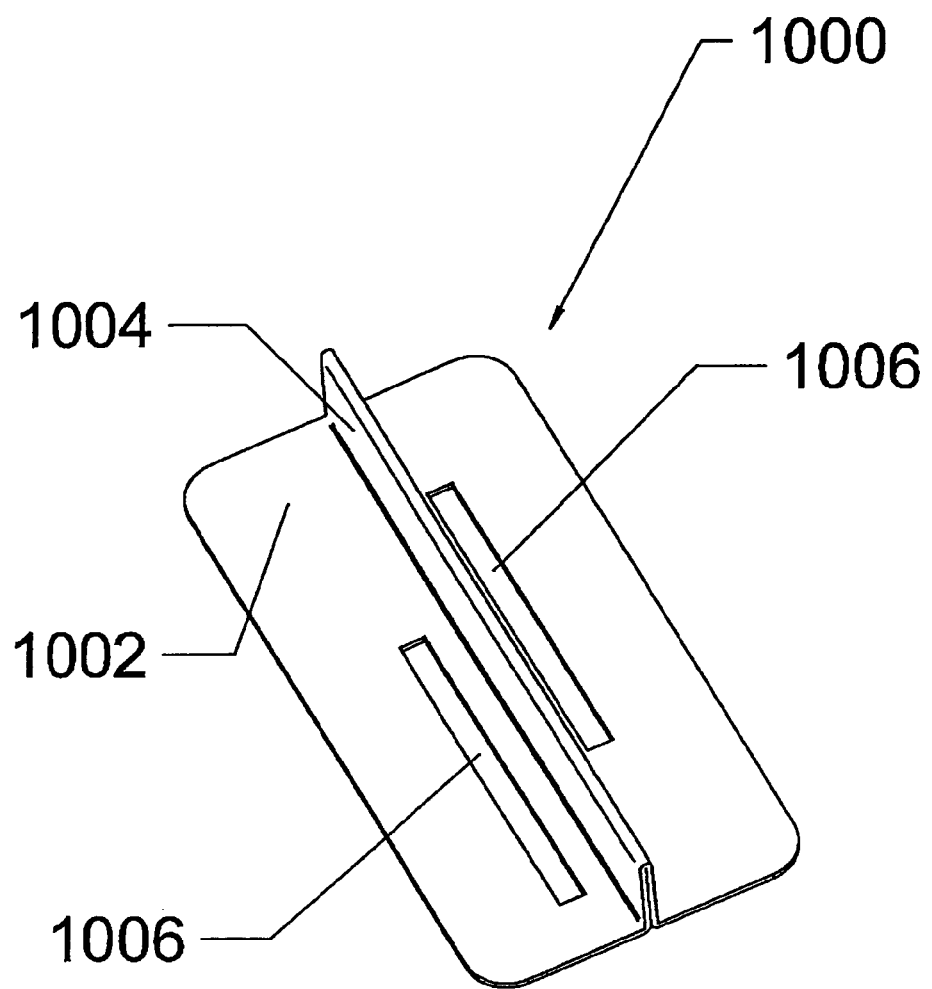
FIG. 10 illustrates an optional fin guard for use with the security apparatus of FIG. 1 or FIG. 6.

FIG. 10 illustrates an optional fin guard 1000 for use with the security apparatus of FIG. 1 or FIG. 6. Fin guard may be used in situations where the fins of a surfboard may be removed without damaging the surfboard. Removing one or more fins from a surfboard 602 secured by security apparatus 100 or 600 might allow a thief to slide the surfboard out from the adjustable shackle. Fin guard 1000 comprises a rectangular planar surface 1002, wall 1004, and one or more slots 1006. Fin guard 1000 is typically constructed of a rigid material such metal or other material difficult for a thief to destroy. Fin guard 1000 may be easily constructed from a single piece of metal and folded into a shape roughly equivalent to the structure shown in FIG. 10, or it may be formed of separate pieces and joined together using methods known in the art. Fin guard 1000 may comprise virtually any shape when viewed in a planar fashion.

Figure 11:
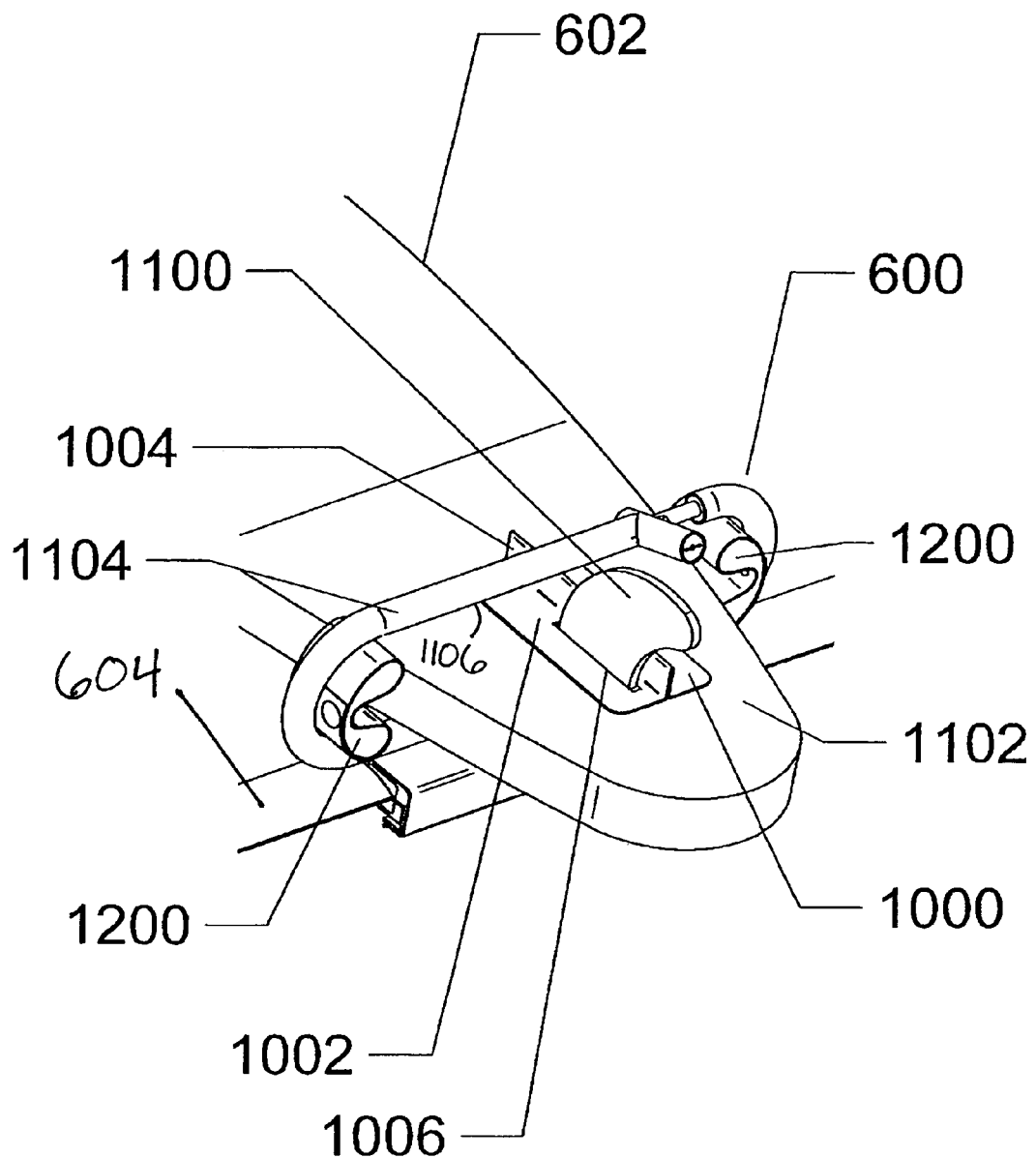
FIG. 11 illustrates an optional fin guard in use with a surfboard and the security apparatus of FIG. 1 or FIG. 6.

Slot 1006 is shaped to accept a surfboard fin, ideally long enough and wide enough to allow a variety of fin sizes and shapes to pass. In an alternative embodiment, fin guard 1000 may comprise two or more slots 1006, either sized differently or identical to each other, to accept various size fins and/or for placement of wall 1004 within adjustable shackle 1104, as depicted in FIG. 11. Wall 1004 may comprise a length equal to, greater, or less than the length of planar surface 1002.

FIG. 11 illustrates optional fin guard 1000 in use with a surfboard 602 and security apparatus 600. Alternatively, optional fin guard 1000 can be used in a similar manner with respect to security apparatus 100. During assembly, fin 1100 is placed through slot 1006, allowing planar surface 1002 to rest against underside 1102 of surfboard 602, covering one or more mechanisms used to removably secure fin 1100 to surfboard 602. Surfboard 602 is then placed through an aperture formed by adjustable shackle 1104, and the shackle is adjusted to fit snugly against the rails of surfboard 602, then locked in place. For other types of objects being secured, the shackle is adjusted to a similar physical property, such as the edges of a wakeboard, snowboard, or the like. At this point, the surfboard 602 is prevented from being moved fore or aft, due to fin 1100 and the increased width of surfboard 602, respectively. Accordingly, fin guard 1000 remains in a fixed or near-fixed relationship with adjustable shackle 1104. Specifically, the wall 1004 remains wedged underneath a bottom portion 1106 of adjustable shackle 1104. It should be understood that the top portion of wall 1004 need not make contact with bottom portion 1106, or any other portion of adjustable shackle 1104, as long as planar surface 1002 is not able to be moved a distance that would allow access to the one or more mechanisms removably securing fin 1100 to surfboard 602. Wall 1004 is sufficient in length to extend far enough past adjustable shackle 1104 so that fin guard 1000 can not be removed or moved enough to compromise the one or more mechanisms, even if surfboard 602 is forced fore or aft to its physical limitations imposed by adjustable shackle 1104.

Figure 12:
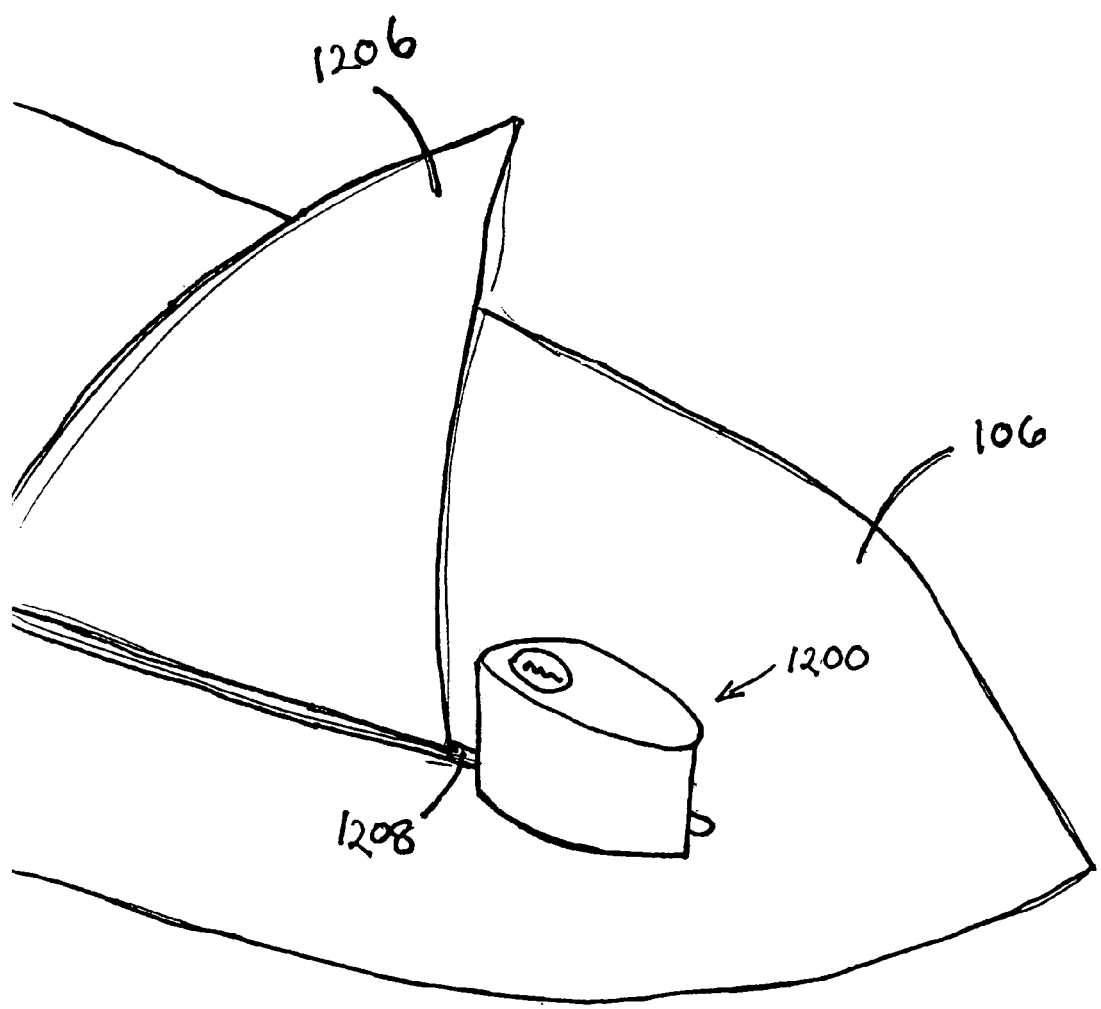
FIG. 12 illustrates another embodiment of a fin guard, generally for use with the security apparatus of FIG. 1 or FIG. 6, shown installed onto a surfboard.

FIG. 12 illustrates another embodiment of a fin guard, shown as fin guard 1200, installed onto a surfboard and used in conjunction with the security apparatus of FIG. 1 or FIG. 6. Fin guard 1200 is generally used in situations where the fins/bindings of a sports board are removable. Such removable fins have become popular in recent years, because they allow for easier transportation and storage of sports boards, and allow inexpensive replacement if a fin or binding should become damaged. However, removing one or more fins/bindings from a sports board secured by security apparatus 100 or 600 might allow a thief to slide the surfboard out from the adjustable shackle. In the case of surfboards, fins of a removable nature are generally held in place by a fin mounting fastener (not shown), generally installed directly behind fin 1206 and into a channel 1208 located underneath a bottom surface of the surfboard.

In one embodiment, fin guard 1200 comprises a housing 1202 and a locking mechanism 1204. Fin guard 1200 mounts to the surface of surfboard 106 over channel 1208 generally behind fin 1206 and covers a fin mounting fastener, such as a screw, bolt, rivet, clip, or other fastening device, generally located within channel 1208. Housing 1202 thus prevents access to the fin mounting fastener, thereby preventing removal of the fin. Fin guard 1200 is held in place over channel 1208 by a combination of a shaft/tab arrangement and a retractable deadbolt (not shown), both described in detail below. Fin guard 1200 is typically constructed of a rigid material such metal or other material difficult for a thief to destroy. It should be understood that fin guard 1200 may comprise virtually any shape when viewed from a top view, including square, rectangular, oval, or triangular shapes, among others.

Figure 13:
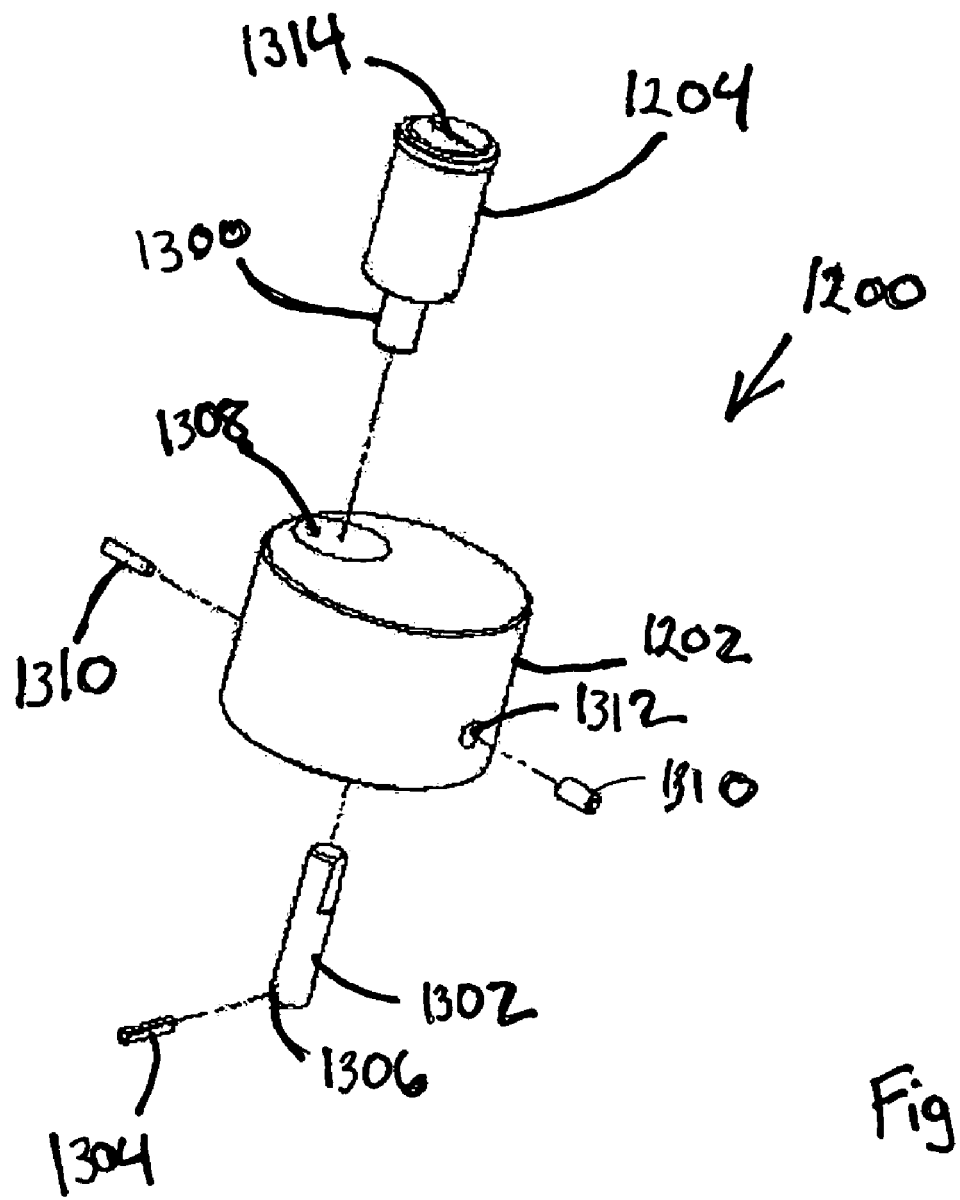
FIG. 13 illustrates the fin guard of FIG. 12 in an exploded view.

FIG. 13 illustrates the fin guard 1200 of FIG. 12 in an exploded view. Shown are housing 1202, locking mechanism 1204, securing means 1300, shaft 1302, tab 1304, tab mounting hole 1306, locking mechanism mounting hole 1308, locking mechanism retaining hardware 1310, retaining hardware hole 1312, and keyed portion 1314.

Locking mechanism 1204 and securing means 1300 are generally purchased as a single unit. Locking mechanism 1204 is fixedly installed into locking mechanism hole 1308, secured by, for example, retaining hardware 1310, which may comprise any known fastening devices, such as a nut and bolt combination, a pin and receptacle combination, etc. Securing means 1300 typically comprises a retractable deadbolt, pin, latch, or other extrusion.

In one embodiment, a keyed portion 1314 of locking mechanism 1204 is raised a certain distance above a top surface of housing 1202 when the locking mechanism 1204 is in an unlocked position, thus retracting securing means 1300 within housing 1202. In a locked position, keyed portion 1314 is pushed down into housing 1202, forcing securing means 1300 to extend from a bottom surface of housing 1202. A key is then used to lock securing means 1300 into the extended position. Generally, keyed portion 1314 remains within housing 1202 in the locked position and is spring-loaded such that it extends into the raised position upon being unlocked. It should be understood that although locking mechanism 1204 is shown as a keyed locking mechanism, other types of locking mechanisms could be used in the alternative, such as a combination locking mechanism.

Referring back to FIG. 13, shaft 1302 is, in one embodiment, fixedly attached to a bottom surface of housing 1202. A pin or tab 1304 is inserted through a tab mounting hole 1306 in one end of shaft 1302. In one embodiment, tab 1304 is inserted such that only one end of tab 1304 protrudes from tab mounting hole 1306, while in another embodiment, tab 1304 is inserted such that two ends protrude from tab mounting hole 1306. Thus, tab 1304 is in a fixed relationship with shaft 1302 and, therefore, housing 1202. Therefore, if housing 1202 is rotated around a longitudinal axis, tab 1304 will likewise rotate in relation to housing 1202.

Figure 14:
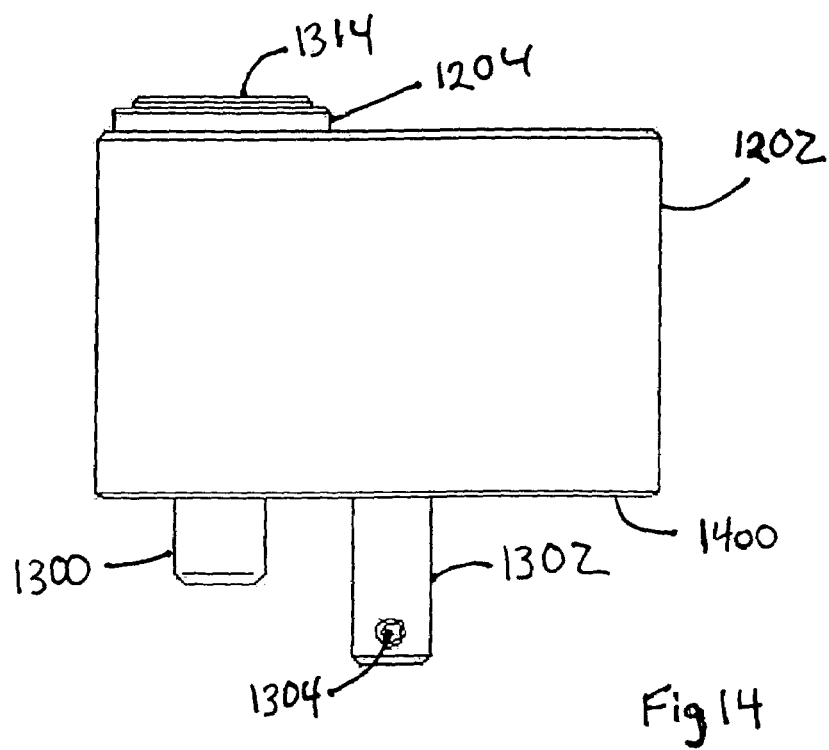
FIG. 14 illustrates the fin guard of FIG. 12, shown in a side view.

FIG. 14 illustrates fin guard 1200, shown in a side view, having housing 1202, locking mechanism 1204, shaft 1302, tab 1304, securing means 1300, and lower surface 1400. Securing means 1300 is shown in an extended position, with locking mechanism 1204 in a locked position. When locking mechanism 1204 is in an unlocked position, securing means 1300 retracts into housing 1202. It should be understood that although this embodiment of fin guard 1200 comprises securing means 1300 being retractable and shaft 1302/tab 1304 being fixed with respect to housing 1202, fin guard 1200 could alternatively comprise a shaft/tab combination that is rotatable with respect to housing 1202 by using locking mechanism, while securing means 1300 is fixed in an extended position as shown in FIG. 14. In this embodiment, housing 1202 is placed over channel 1208 with tab 1304 oriented parallel to channel 1208 and securing means 1300 aligned with channel 1208, allowing both securing means 1300 and tab 1304 to be inserted within channel 1208, bringing housing 1202 flush against channel 1208. Then, locking mechanism is placed in a locked position, whereby shaft 1302 and tab 1304 are rotated such that tab 13041204 becomes perpendicular to channel 1208, lodging tab 1304 underneath a lip of channel 1208 (illustrated as Lip 1600 in FIG. 16*a*). In this position, housing 1202 is prevented from being removed from channel 1208 by tab 1304 engaged with the lip of channel 1208, while housing 1202 is prevented from being rotated by securing means 1300.

Figure 15:
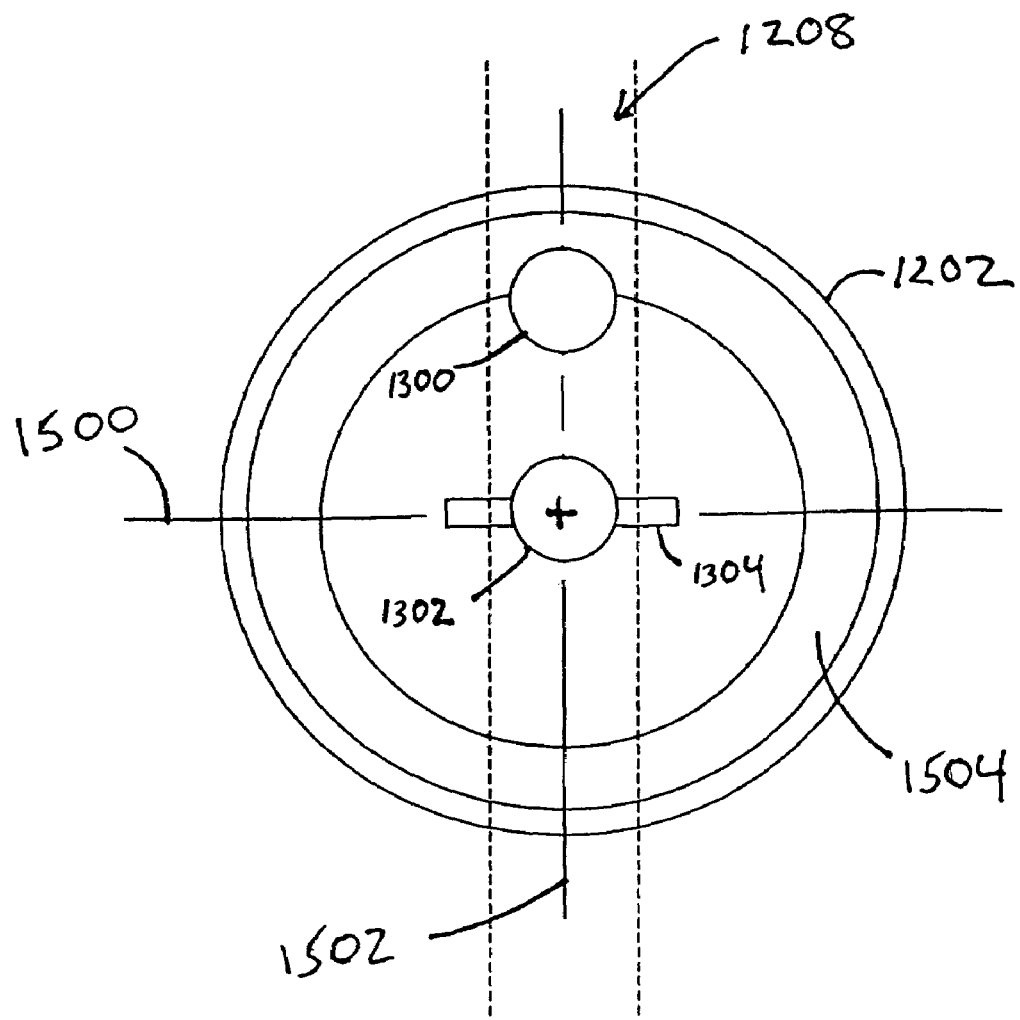
FIG. 15 illustrates a bottom planar view of the fin guard of FIG. 12.

FIG. 15 illustrates a bottom planar view of fin guard 1200 of FIG. 12. In this illustration, tab 1304 extends from both sides of shaft 1302 along a longitudinal axis 1500. Securing means 1300 is located along an axis 1502 perpendicular to longitudinal axis 1500. The alignment between securing means 1300 and tab 1304 is such that both features extend into a channel (shown as dashed lines 1208) located on a bottom surface of a sports board installation, with tab 1304 locking within channel 1208 and securing means 1300 extending into channel 1208 preventing rotation of housing 1202 and, thus, tab 1304.

Installation of fin guard 1200 onto surfboard 106 is accomplished by, first, having securing means 1300 retracted, i.e., locking mechanism 1204 in an unlocked position. Housing 1202 is rotated such that tab 1304 is parallel to channel 1208. The housing is then placed flush against the bottom surface of surfboard 106, generally just behind fin 1206, allowing shaft 1302 and tab 1304 to extend into channel 1208. An optional race 1504 allows a fin mounting fastener, located on the bottom surface of surfboard 106, to be inserted into race 1504 at this point, thereby allowing housing 1202 to lie smoothly against the bottom surface of surfboard 106. Although shown as completely circumnavigating the circumference of housing 1202, race 1504 may, in other embodiments, comprise a hole or other depression that does not completely circumnavigate the circumference of housing 1202.

Figure 16:
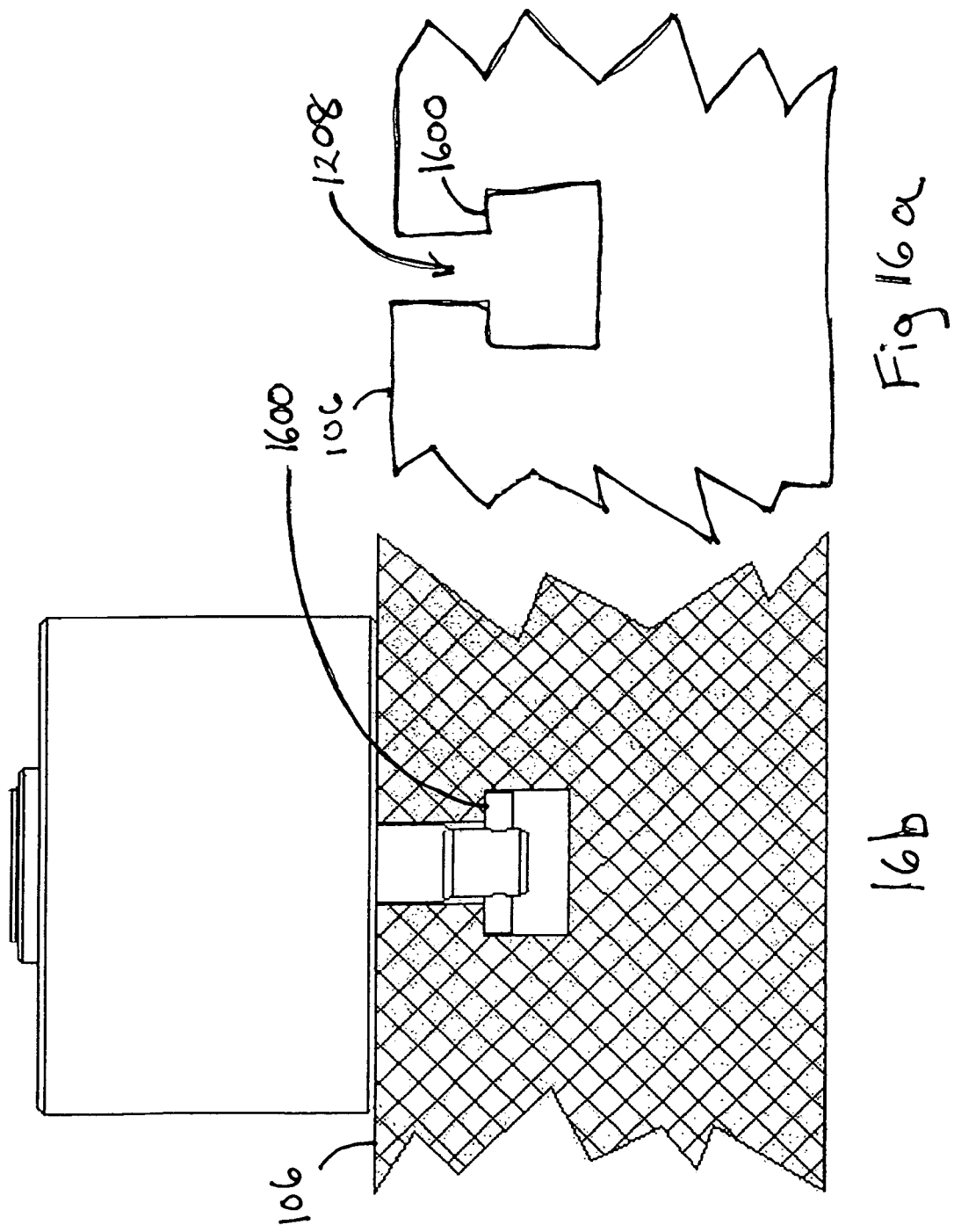
FIG. 16a is a cross-sectional view of a channel located beneath a bottom surface of a surfboard.
FIG. 16b is a cross-sectional view of the channel of FIG. 16a, with the fin guard of FIG. 12 installed thereon.

With housing 1202 resting flush against the bottom surface of surfboard 106, housing 1202 is then rotated such that tab 1304 is perpendicular to channel 1208 and engaging a lip 1600 within channel 1208 (shown in cross section in FIG. 16*a*). In this position, securing means 1300 is also aligned with channel 1208. Next, securing means 1300 is inserted into channel 1208, and is locked in place by placing locking mechanism 1204 in a locked position. With securing means 1300 inserted into channel 1208, housing 1202, and therefore tab 1304, cannot rotate, thereby preventing removal of fin guard 1200 and, thus, fin 1206. The final installation is shown in cross section in FIG. 16b. Removal of fin guard 1200 involves unlocking locking mechanism 1204 such that securing means 1300 retracts from channel 1208 and into housing 1202. Housing 1202 is then rotated approximately 90 degrees, thus disengaging tab 1204 from lip 1600. Housing 1202 is then free to be removed from the surface of the surfboard.

Figure 17:
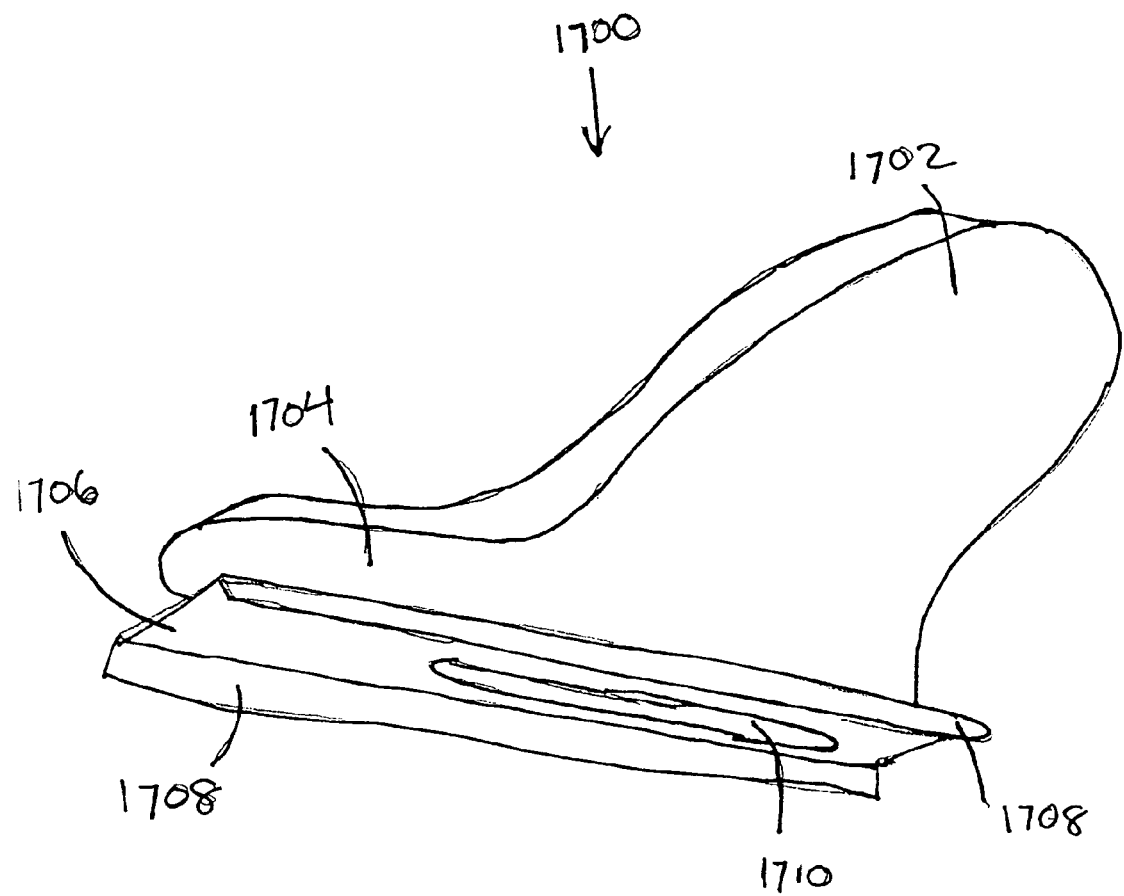
FIG. 17 is an isometric view of another embodiment of a fin guard.

FIG. 17 is an isometric view of another embodiment of a fin guard, shown as fin guard 1700. Fin guard 1700 is designed to cover a sports board fin to prevent the fin from being removed from a sports board. Fin guard 1700 is especially useful on fins that are removable without using any type of fin locking fasteners. Such fins are removed generally by simply prying the fin out of a channel located beneath the bottom surface of the sports board.

Fin guard 1700 comprises a fin enclosure 1702 and an elongated member 1704, which is sized and shaped to wedge between an inner portion of the locking apparatus of FIG. 1 or FIG. 6 and the bottom surface of surfboard 106, thereby preventing fin guard 1700, and thus a surfboard fin, from being removed from surfboard 106. Fin enclosure 1702 is sized and shaped to accommodate various sizes of fins and is approximately one inch wide, in one embodiment. Fin enclosure 1702 is generally hollow, allowing fins to be completely enclosed by fin enclosure 1702.

Fin guard 1700 further comprises base 1706 to which elongated member 1704 and fin enclosure 1702 are mounted. Base 1706 may comprise raised edges 1708, which allows fin guard 1700 to rest flush against the bottom surface of surfboard 106, allowing for any fin mounting hardware to reside within a cavity formed by base 1706 and the bottom surface of surfboard 106. Base 1706 comprises a slotted opening 1710, allowing a fin to enter fin enclosure 1702.

Elongated member 1704, fin enclosure 1702, and base 1706 may be constructed of any rigid material such as plastic, metal, fiberglass, resins, etc. In one embodiment, elongated member 1704 and fin enclosure 1702 are constructed as a single unit, although that need not be the case. Further, elongated member 1704 and fin enclosure 1702 may be constructed by molding two half sections and joining the two halves together using glue, resin, epoxy, welding, or by other means known in the art. Base 1706 may likewise be manufactured from any suitable rigid material, and joined with elongated member 1704 and fin enclosure 1702 using the techniques just described.

Figure 18:
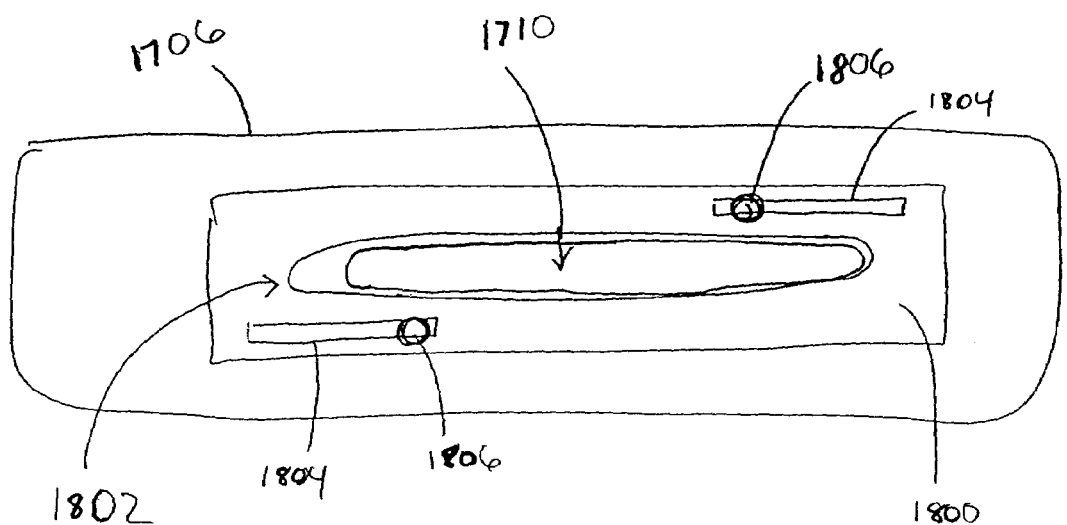
FIG. 18 illustrates a bottom planar view of the fin guard of FIG. 17.

FIG. 18 illustrates a bottom planar view of fin guard 1700. Shown is base 1706, and optional adjuster plate 1800. Adjuster plate 1800 is used to vary the length of slot opening 1710 to accommodate different sized fins. The thickness of adjuster plate 1800 is generally less than the height of raised edges 1708 so that adjuster plate 1800 fits within a cavity formed by base 1706 and the bottom surface of surfboard 106. Adjuster plate 1800 is mounted to base 1706 and comprises adjusting slot 1802, mounting slots 1804, and fasteners 1806. Adjusting slot 1802 is generally equal in length to slot opening 1710 and resides situated over slot opening 1710. The width of adjusting slot 1802 may be slightly larger than, equal to, or slightly smaller than slot opening 1710. The resultant slot, formed from the overlap of slot opening 1710 and adjusting slot 1802, can be varied in length depending on the location of adjusting slot 1802. This enables fins of various sizes to be accepted by fin enclosure 1702. The size of the resultant slot is varied by sliding adjuster plate 1800 fore and aft and is then secured in place using fasteners 1806, which may comprise screws, bolts, or other fastening means. It should be understood that adjuster plate 1800 could also be used to vary the position of adjusting slot 1802, rather than the size of a resultant slot, if slot opening 1710 is not used. In other words, if fin enclosure 1702/base 1706 does not comprise slotted opening 1710 and simply comprises open space leading into fin enclosure 1702, then adjuster plate 1800 can be used to position adjusting slot 1802 fore and aft, to accommodate various fin positions.

Figure 19:
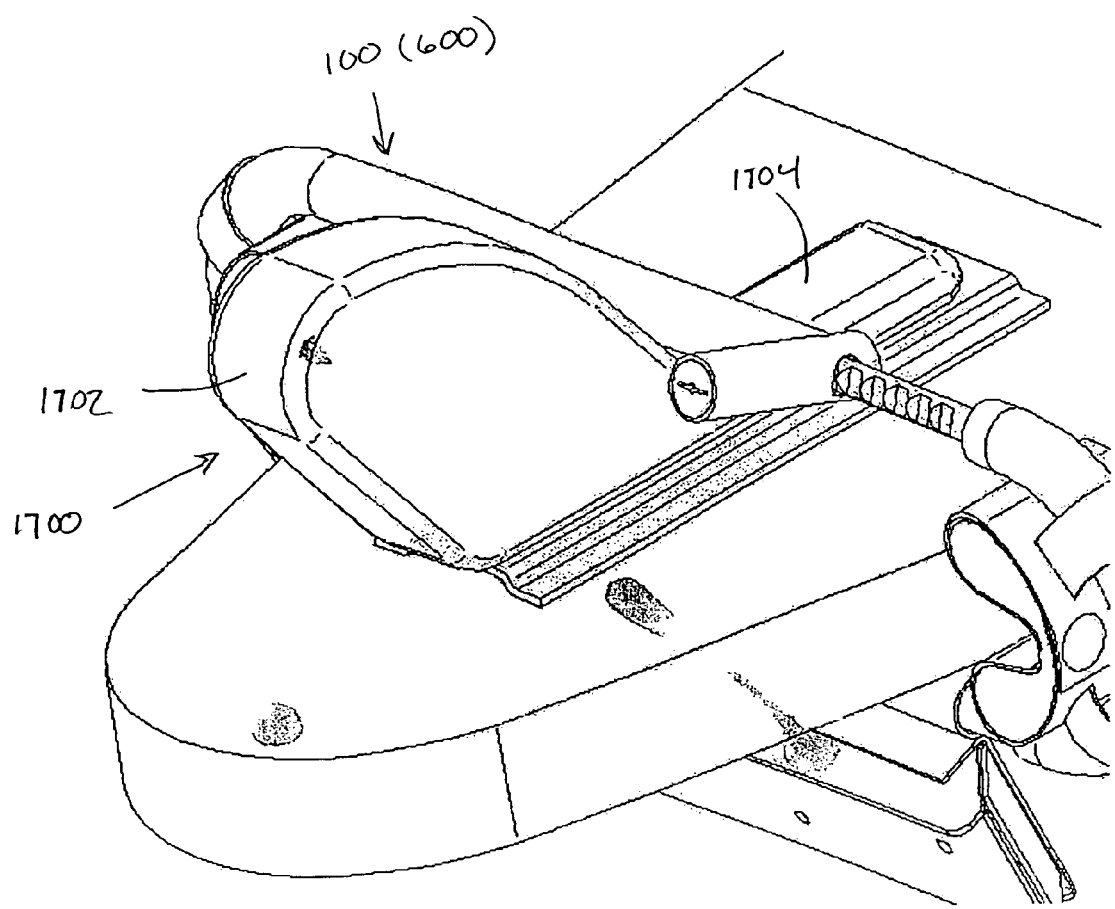
FIG. 19 is an isometric view of the fin guard of FIG. 17 installed over a surfboard fin and used in conjunction with the security apparatus of FIG. 1 or FIG. 6.

FIG. 19 is an isometric view of fin guard 1700 installed over a surfboard fin and used in conjunction with the security apparatus 100 of FIG. 1 or 600 of FIG. 6. Fin enclosure 1702 is shown covering a fin of surfboard 106, while elongated member 1704 is shown wedged between a bottom surface of surfboard 106 (along with base 1706) and an inner surface of adjustable shackle 304 of the security apparatus of FIG. 1 or FIG. 6. It should be understood that elongated member 1704 may be directly in contact with the bottom surface of a sports board (in the case where base 1706 is absent, or if base 1706 only extends the length of fin enclosure 1702) or sandwiched between base 1706 and the security apparatus of FIG. 1 or FIG. 6, with base 1706 in contact with the bottom surface of surfboard 106. Fin guard 1700 cannot be removed from the fin, because of the wedging effect of elongated member 1704. Surfboard 106 cannot move in an aft direction because of the contour of surfboard 106 against the security apparatus of FIG. 1 or FIG. 6.

FIGS. 20a and 20b illustrate two views of an optional cushion 2000 used in the security apparatus of FIG. 1 or FIG. 6. Cushion 2000 is typically used in pairs, each cushion secured to a curved portion of adjustable shackle 304 or 804, as the case may be. Although not essential to the embodiments described herein, the optional cushions allow a surfboard 102 to be secured within an opening formed by adjustable shackle 304 or 804 without damaging the rails of surfboard 102. Additionally, the cushions 2000 allow a top and bottom surfaces of surfboard 102 to avoid contact with an inside surface of adjustable shackle 304 or 804, thereby avoiding damage to those surfaces.

Cushion 2000 comprises a contact surface 2002 which is designed to conform to a surfboard rail cross-section. Contact surface 2002 comprises a material which is semi-rigid, allowing the contact surface 2002 to flex and fit snugly against a surfboard rail. The material comprises a smooth surface so that the surfboard rails are not scratched or otherwise damaged by the cushion. Examples of such materials include plastic, rubber, polyurethane, or other suitable material. Cushion 2000 typically comprises filler 2004 for helping maintain the overall shape of the cushion. Filler 2004 may comprise varying degrees of elasticity, ranging from soft to hard. In one embodiment, filler 2004 comprises foam rubber, but in other embodiments, could comprise plastic, epoxy, resin, rubber, wood, etc. In yet another embodiment, no filler is used.

It should also be understood that cushion 2000 could alternatively comprise a malleable object, such as a balloon filled with gel, air, or some other material. In such an embodiment, cushion 2000 would conform to a surfboard rail cross-section upon impact with the surfboard.

Cushion 2000 typically comprises one or more means for securing the cushion to adjustable shackle 304 or 804. As illustrated in FIG. 20, fastening means 2006 comprises a pin which comprises a flared end that is inserted through a hole located on a curved portion inner surface of adjustable shackle 304 or 804. The length of the pin is such that it will not allow cushion 2000 to be rotated or displaced laterally, disengaging the pin from the hole in the curved portion, thereby providing additional clearance that could allow the surfboard to be removed. Cushion 2000 additionally comprises retainers 2008 for wrapping around a portion of adjustable shackle 304 or 804, thereby additionally securing cushion 2000 in place. The retainers 2008 may comprise any material for wrapping around a portion of adjustable shackle 304 or 804 including string, tie-wraps, leather straps, or, in the embodiment shown in FIG. 20, Velcro straps. The retainers 2008 are secured to a rear portion of cushion 2000 by any suitable means, such as a pin, rivet, or other means.

Figure 21A:
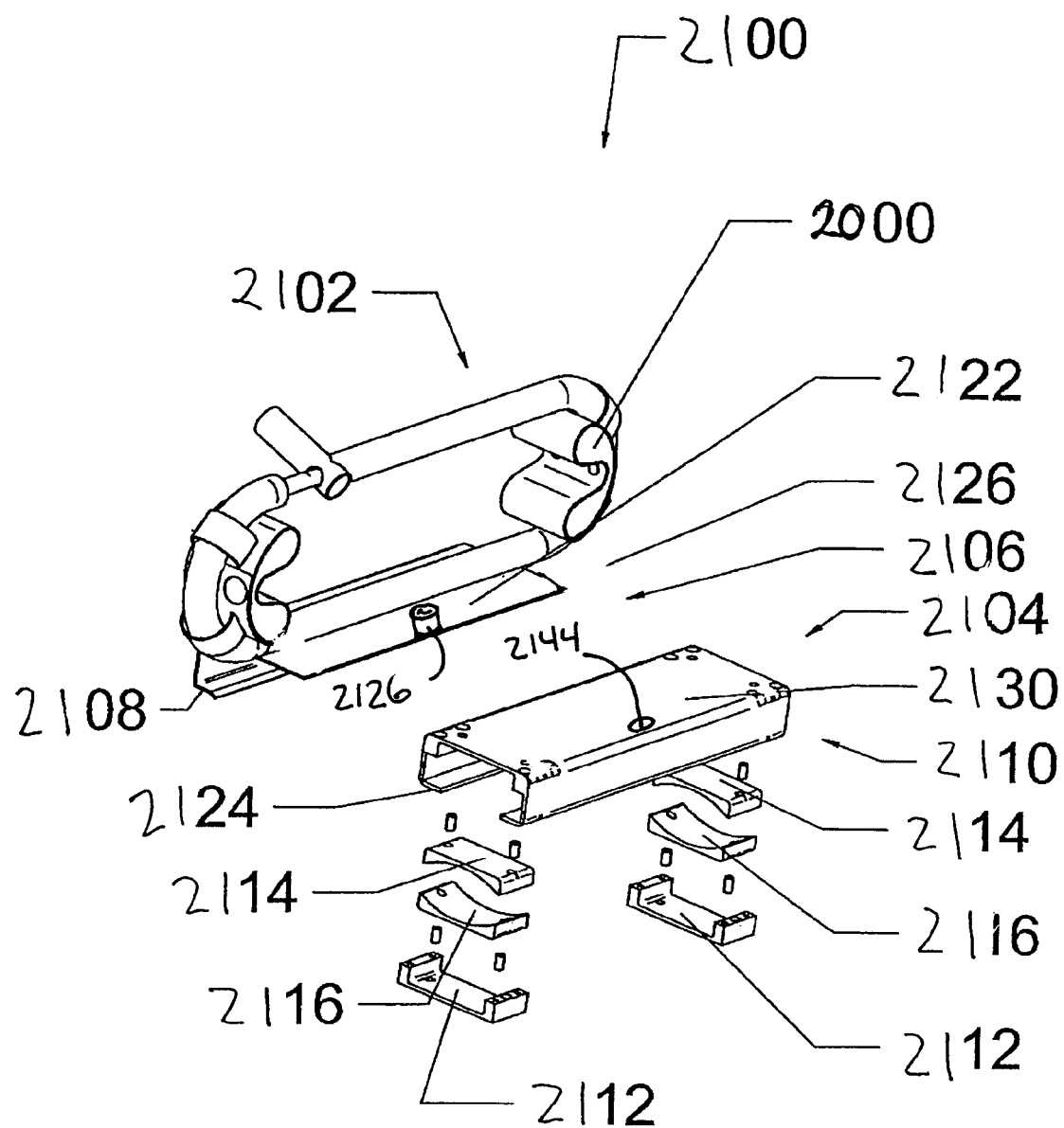
FIGS. 21a and 21b are exploded views of yet another embodiment of a security apparatus for securing an object to a vehicle.
Figure 21B:
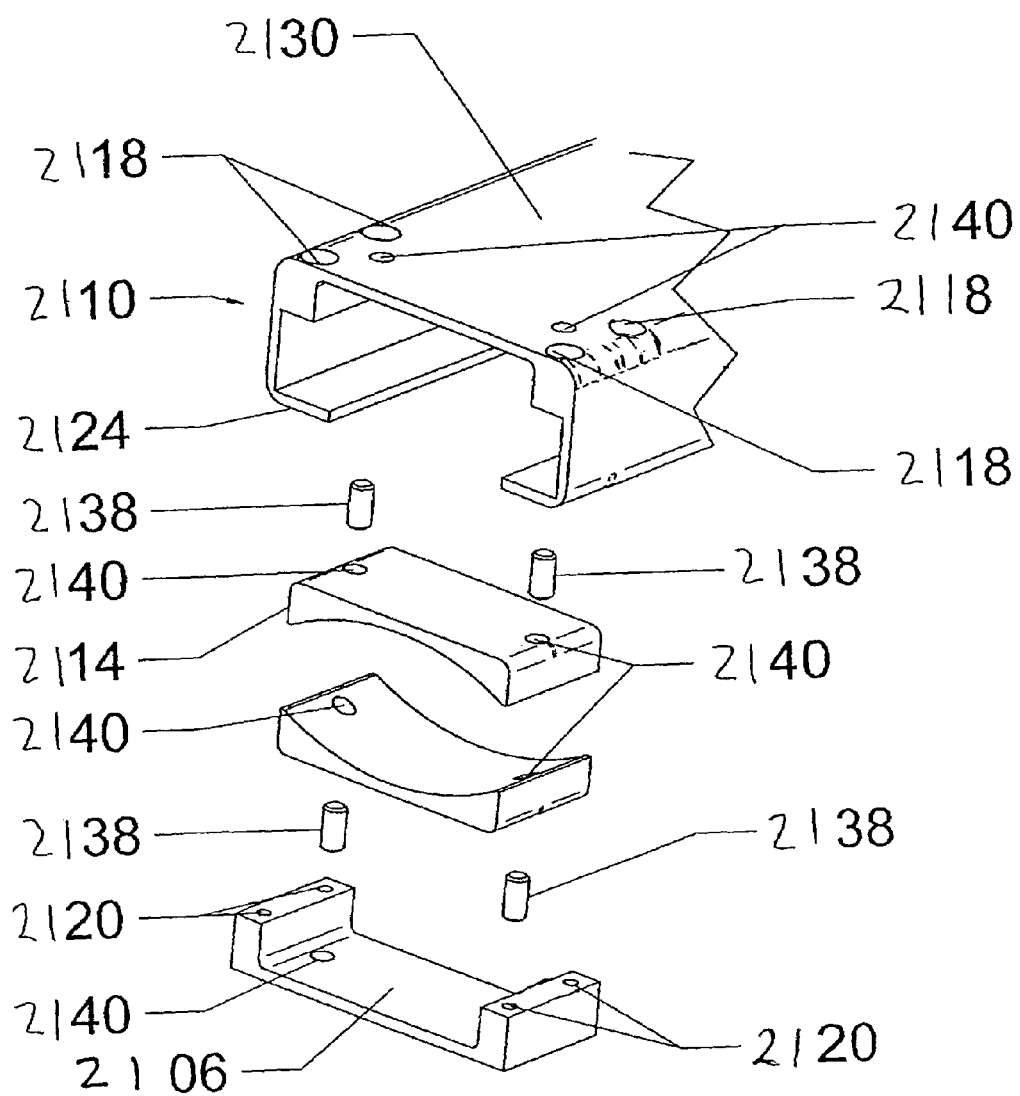

FIGS. 21a and 21b are exploded views of yet another embodiment of a security apparatus 2100 for securing an object to a vehicle. Cushions 2000 are installed as illustrated. The security apparatus 2100 of this embodiment comprises mating unit 2102 and mounting bracket 2104. The mating unit 2102 is quite similar to mating unit 300 of FIG. 3a with the exception of mating portion 2106. Mating portion 2106 comprises an L-shaped extrusion which slides over mounting bracket 2104 upon installation. Mating portion 2106 comprises a bottom lip 2108 which prevents mating unit 2102 from being removed from mounting bracket 2104 after mating unit 2102 is removably secured to mounting bracket 2104.

Mounting bracket 2104 comprises extrusion 2110, lower bracket 2112, upper insert 2114, and lower insert 2116. A vehicle roof rack is sandwiched between upper insert 2114 and lower insert 2116, then the inserts are secured within extrusion 2110 using lower bracket 2112.

FIG. 21b shows a more detailed view of extrusion 2110, lower bracket 2112, upper insert 2114, and lower insert 2116. Lower insert 2116 is held within lower bracket 2112 and upper insert 2114 held within extrusion 2110 by one or more fastening means 2138. Fastening means 2138 comprises four retaining pins which fit into receiving holes 2140 located on extrusion 2110, lower bracket 2112, upper insert 2114, and lower insert 2116, as shown. Of course, a greater or fewer number of fastening means could be used in the alternative, or other means could be used, either alternatively or in addition to, to fasten the inserts to extrusion 2110 and lower bracket 2112. When the components of FIG. 21b are assembled, the inserts form an opening which conforms to the shape of a vehicle roof rack. The inner surface of the inserts may be shaped to conform with the different roof rack shapes available on the market from vehicle manufacturers or after-market suppliers.

The lower bracket 2112 is fixedly secured to extrusion 2110 using any known fastening means, such as screws, rivets, bolts, etc. through holes 2118 and 2120. Four pairs of such holes are shown in the embodiment of FIG. 21b but a fewer or greater number of holes could be used in the alternative. The lower bracket 2112 may be secured to extrusion 2110 by other means, such as welding, either in addition or alternatively to the screws, rivets, or bolts. The mounting bracket 2104, therefore, is generally fixedly secured to a vehicle roof rack, and remains in place whether or not mating unit 2102 is attached. The inserts are held securely in place by the clamping force of the securing means.

During assembly of mating unit 2102 to mounting bracket 2104, the mating unit 2102 slides onto mounting bracket 2104, with an upper surface 2122 covering an upper surface 2130 of extrusion 2110. Bottom lip 2108 covers a portion of a lower surface 2124 of extrusion 2110. One or more locking mechanisms similar to the type described in FIGS. 3b and 3c herein, are located on upper surface 2122 and align with one or more apertures 2144 located on upper surface 2130 of extrusion 2110. A deadbolt, or other physical constraint, is then inserted through aperture 2144 from the locking mechanism(s) 2126, thereby removably securing mating unit 2102 to mounting unit 2104. Like previous embodiments, the locking mechanism(s) 2126 is generally inaccessible when an object is secured through the adjustable shackle.

Figure 22:
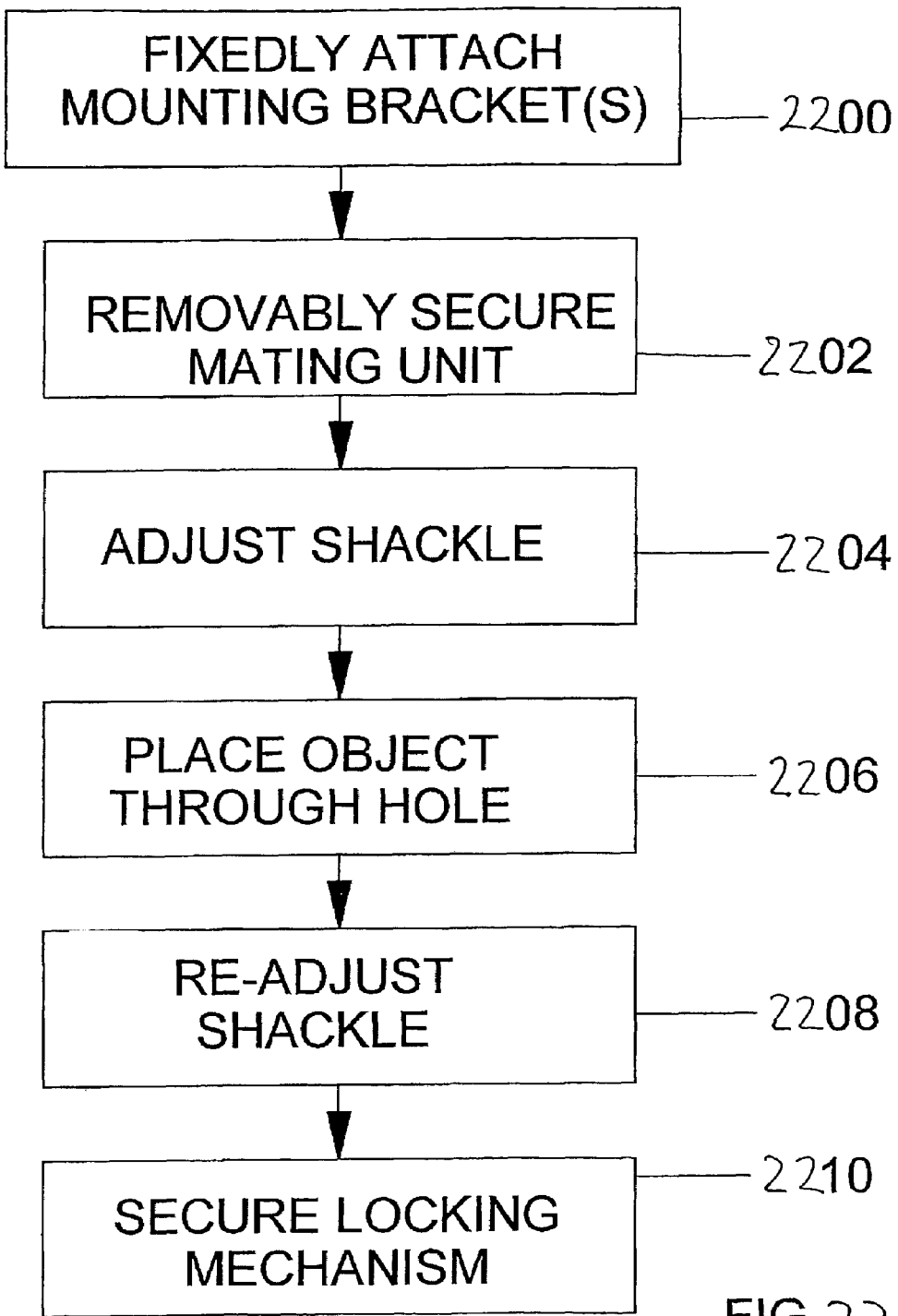
FIG. 22 illustrates a flow diagram illustrating a method for securing an object to a vehicle.

FIG. 22 is a flow diagram illustrating a method for securing an object, such as a surfboard, to a vehicle. The method conforms to the embodiments illustrated in FIG. 1 and FIG. 6, and will be referenced accordingly.

In step 2200, mounting bracket 200 (700) is fixedly attached to a surface of a vehicle, for example, to an inside surface of a pickup truck tailgate or to an existing vehicle roof rack. Mounting bracket 200 (700) is preferably attached in a manner which prevents quick removal of the mounting bracket. Mounting bracket 200 (700) is designed to remain fixedly attached to the vehicle, whether an object is being secured or not.

In step 2202, mating unit 300 (800) is removably secured to mounting bracket 200 (700). In one embodiment, tabs 312 of mating portion 302 are inserted through slots 212 located on bottom surface 210 of mounting bracket 200. Mating unit 300 is then tilted towards mounting bracket 200 until top surface 308 of mating unit 300 overlaps top surface 206 of mounting bracket 200. At this point, second locking mechanism 310 of mating unit 300 will align with aperture 208 of mounting bracket 200. Mating unit 300 is then removably secured to mounting bracket 200 by placing second locking mechanism 310 into a locked position, thereby inserting securing means, such as a deadbolt, latch, or other physical constraint, through aperture 208. Advantageously, this design prevents access of second locking mechanism 310 when an object such as a surfboard is secured through an opening formed by adjustable aperture 304.

In another embodiment, mating unit 800 comprises a U-shaped mating portion 802 which encloses mounting brackets 700. The mating unit comprises one or more locking mechanisms 808, 810, each which align with a corresponding aperture 712 located on receiving block 704. The locking mechanism(s) is(are) then placed into a locked position, thereby inserting securing means, such as a deadbolt, latch, or other physical constraint, into aperture(s) 712. Thereafter, mating unit 800 is removably secured to mounting bracket 700.

In step 2204, adjustable portion 316 of adjustable shackle 304 (or adjustable portion of adjustable shackle 804) is moved if necessary to accommodate the object being secured. First locking mechanism 306 (806) is generally placed in an unlocked position to allow movement of adjustable portion 316 (or adjustable portion of adjustable shackle 804) during this step.

In step 2206, the object to be secured is placed through an opening formed by adjustable shackle 304 (804). In the case of a surfboard, the surfboard is generally placed upside down with the fin(s) extending upward. The nose of the surfboard is then placed through the opening of adjustable shackle 304 (804), resting on a floor of a pickup truck bed in one embodiment, or a front portion of the surfboard resting on a standard securing system or second security apparatus 600 located on a forward roof rack in another embodiment. The surfboard is positioned forward until either the fin(s) touch adjustable shackle 304 (804), or the width of the surfboard begins to narrow. Alternatively, adjustable portion 316 (or adjustable portion of adjustable shackle 804) may be completely removed from fixed portion 314, thereby allowing the surfboard to be slid sideways into the opening formed by fixed portion 314.

In step 2208, adjustable portion 316 is moved relative to fixed portion 314, such that the opening formed by adjustable shackle 304 is reduced in size to fit snugly against opposing rails of the surfboard. In one embodiment, first locking mechanism 306 may be in a locked or an unlock position during this step (i.e., the first locking mechanism 306 in combination with notches 318 forming a one-way ratchet). Similar operations apply to security apparatus 600.

In step 2210, first locking mechanism 306 (806) is placed into a locked position, generally by using a key. The surfboard is now securely fastened to the security apparatus 100 (600). Second locking mechanism(s) is(are) inaccessible until the surfboard 102 is removed from adjustable shackle 304 (804).

Removal of surfboard 102 is a process reversed from the just-described process of FIG. 22. Mating unit 300 (800) may then be placed within the confines of the vehicle and stored until needed once more.

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments discussed herein, but is to be accorded the widest scope consistent with the principles and novel features disclosed herein.

I claim:

1. An apparatus for securing an object to a vehicle, comprising:
    a mounting bracket;
    a mating unit removably connected to the mounting bracket, the mating unit comprising:
        an adjustable shackle;
        a mating portion, the mating portion being fixedly secured to said adjustable shackle; and
        a first locking mechanism, the first locking mechanism operative to allow adjustment of said shackle in an unlocked position and to prevent adjustment of said shackle in a locked position; and
    a second locking mechanism for removably securing the mating portion to the mounting bracket.

2. The apparatus of claim 1, wherein the second locking mechanism is inaccessible after the object is secured by the adjustable shackle.

3. The apparatus of claim 1 wherein the mounting bracket further comprises a slotted lower surface and the mating unit further comprises a tabbed lower surface, the tabbed lower surface for insertion into the slotted lower surface.

4. The apparatus of claim 1, further comprising a fin guard for covering a fin removal mechanism on the object and for preventing access to the fin removal mechanism.

5. The apparatus of claim 1, wherein the mounting bracket comprises a rear planar surface for mounting to the vehicle, an upper portion connected to the rear planar surface, and a lower portion connected to the rear planar surface, the upper portion and the lower portion for receiving the mating unit.

6. The apparatus of claim 1 further comprising:
    a cushion, the cushion comprising a surface substantially conforming to a cross-section of an edge of the object, the cushion secured to the adjustable shackle.

7. The apparatus of claim 1 wherein the object comprises a surfboard.

8. The apparatus of claim 1 wherein the object comprises a snowboard.

* * * * *